INVENTOR.
ROBERT J. STAHL

BY
Lippincott & Smith
ATTORNEYS

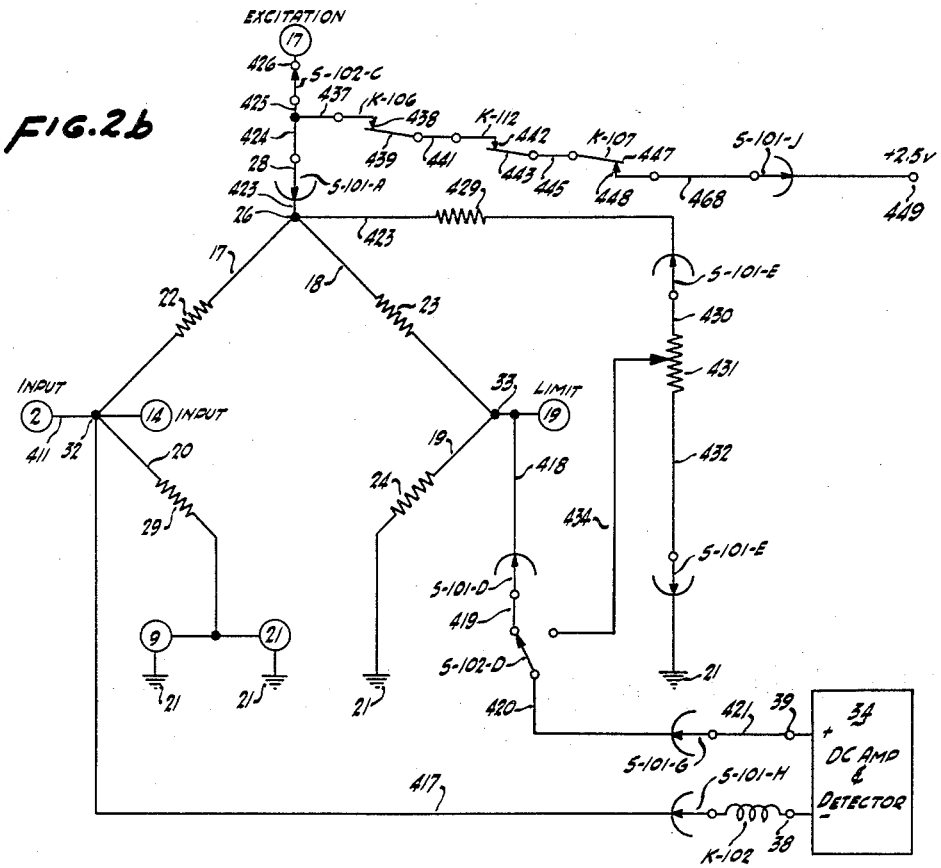
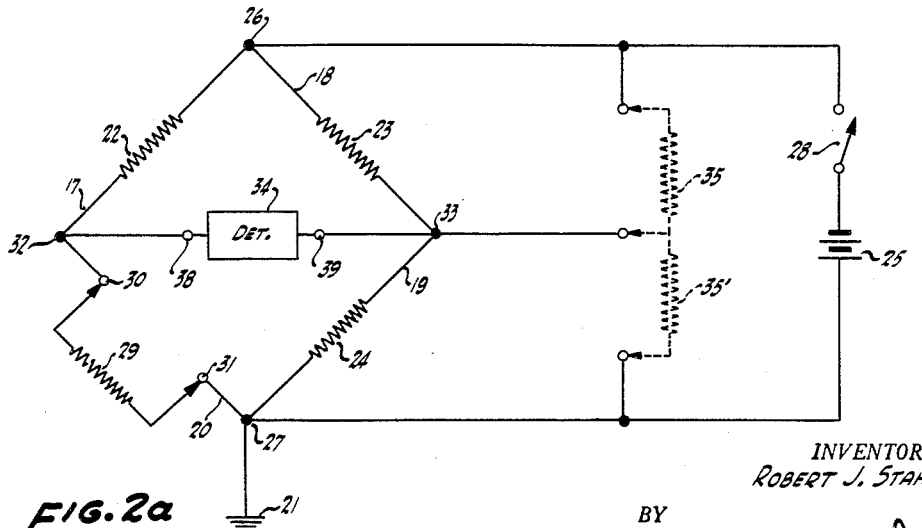

INVENTOR.
ROBERT J. STAHL
BY
Lippincott & Smith
ATTORNEYS

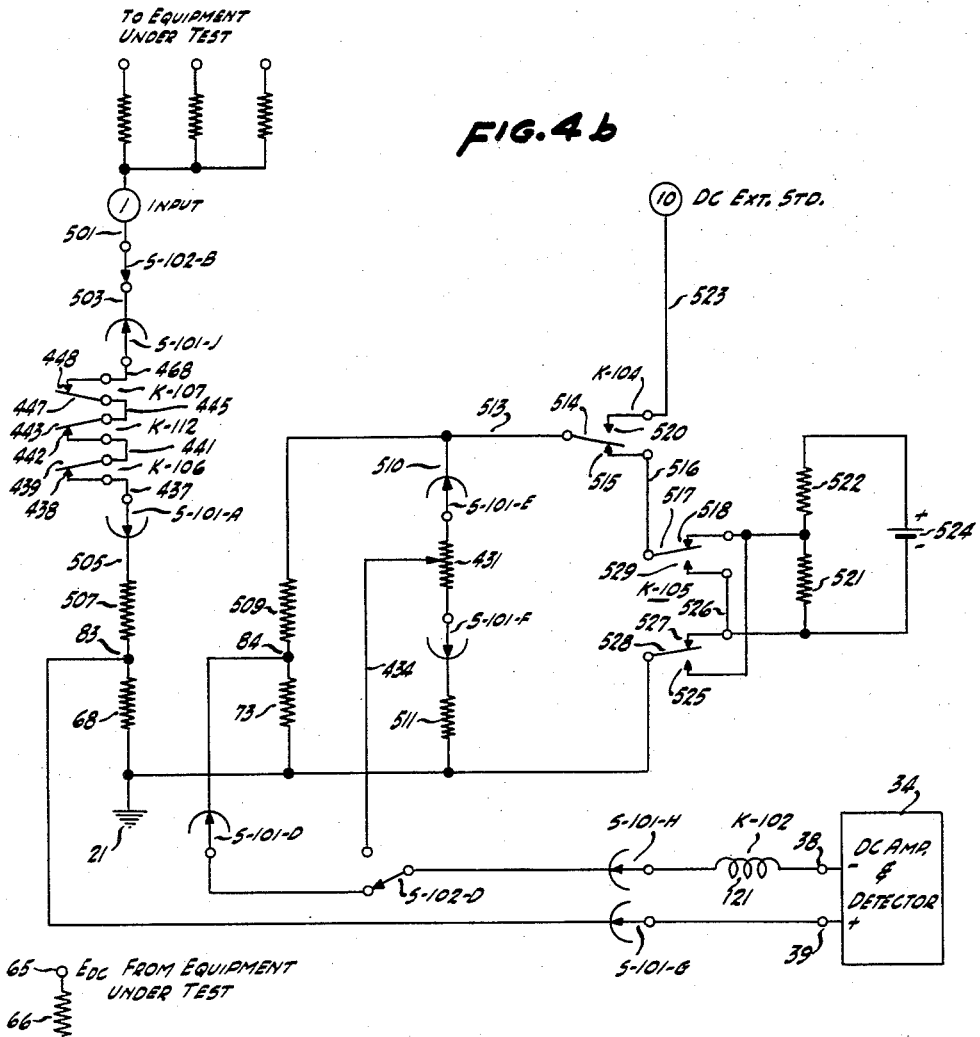
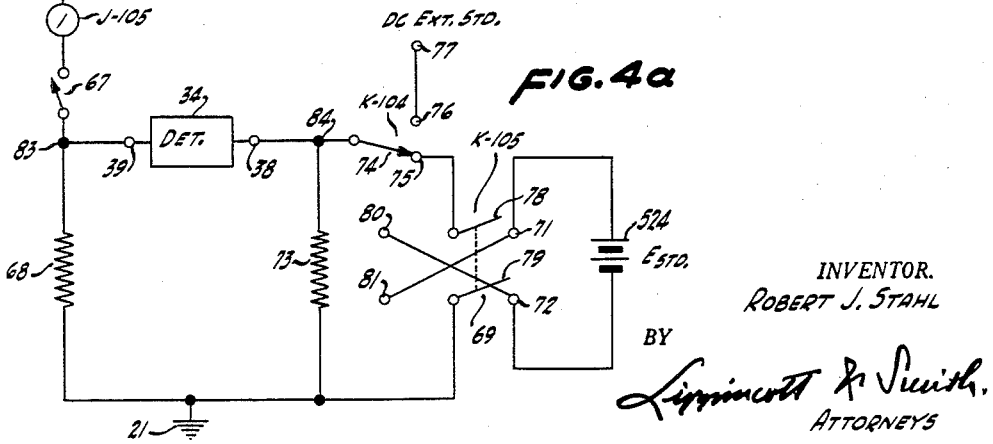

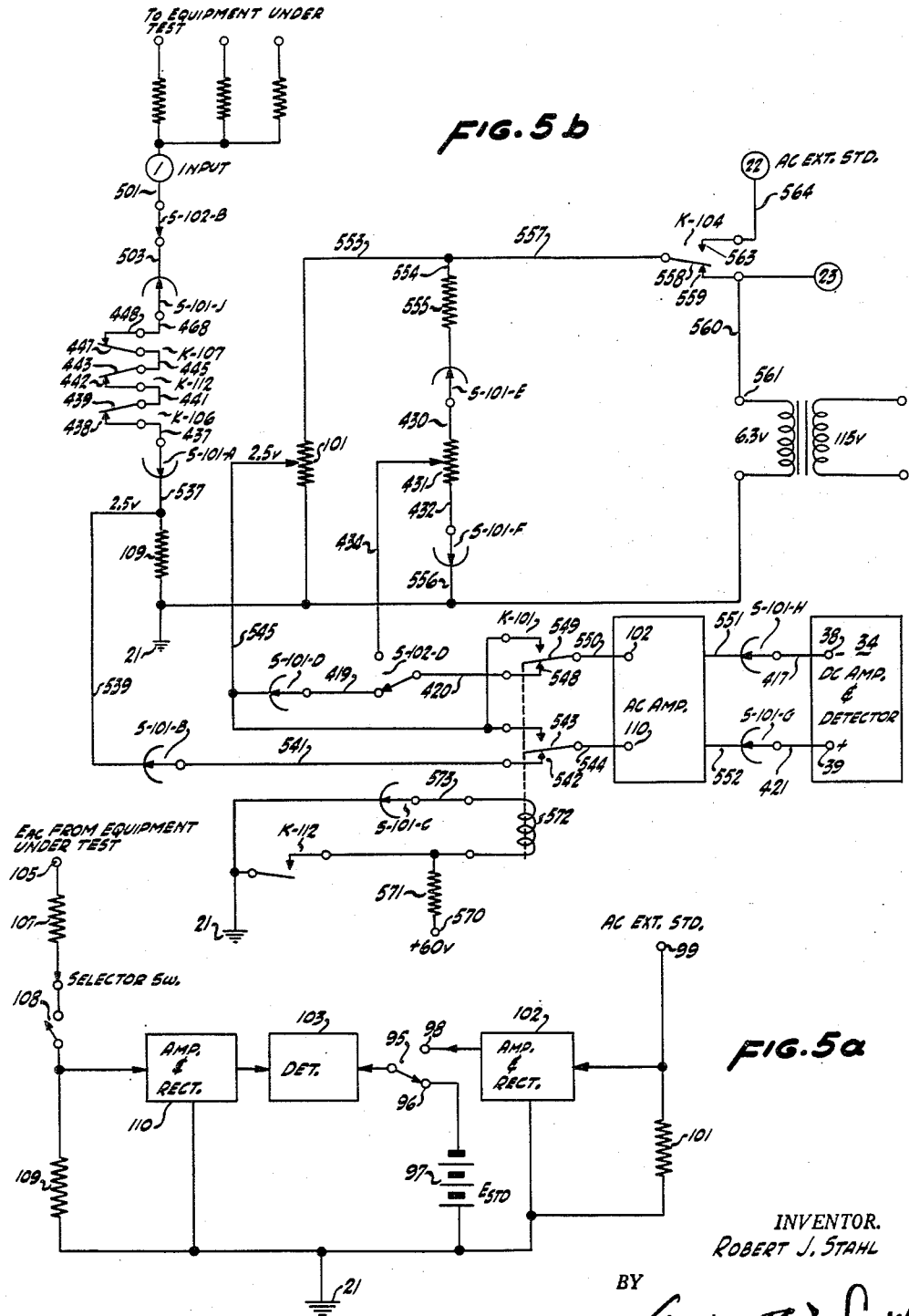

Aug. 23, 1960   R. J. STAHL   2,950,437
CIRCUIT TESTING APPARATUS
Filed Aug. 16, 1954   19 Sheets-Sheet 6
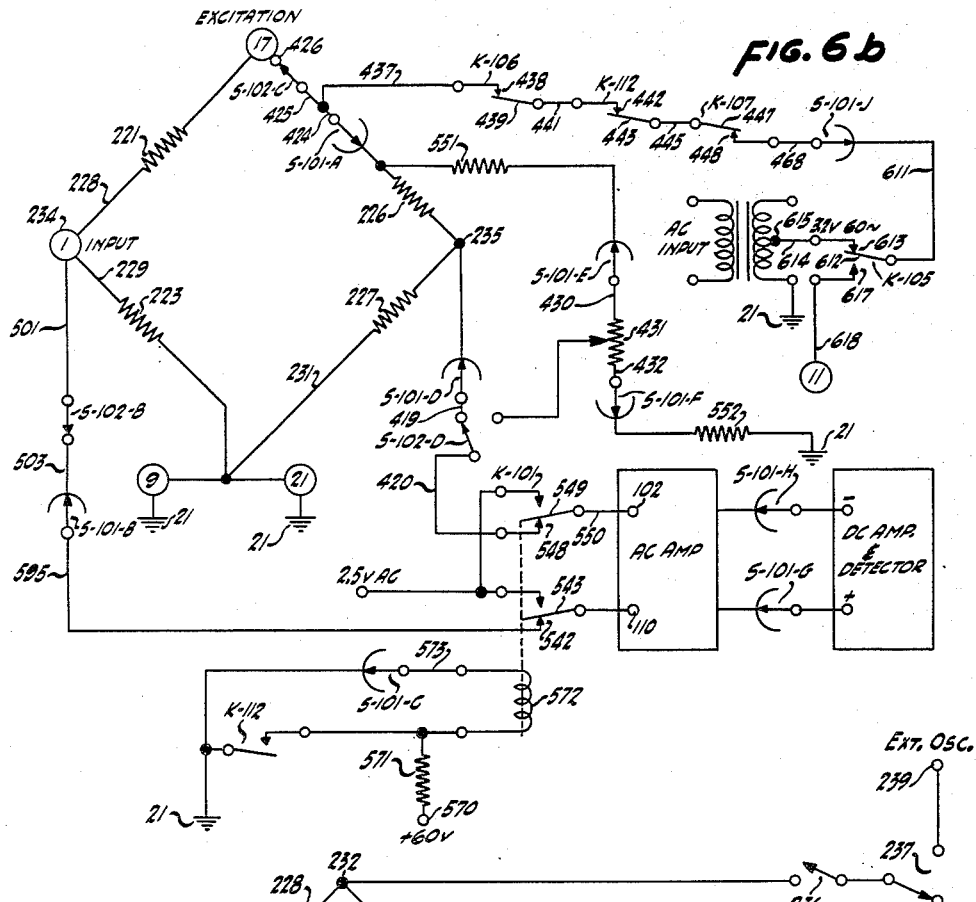
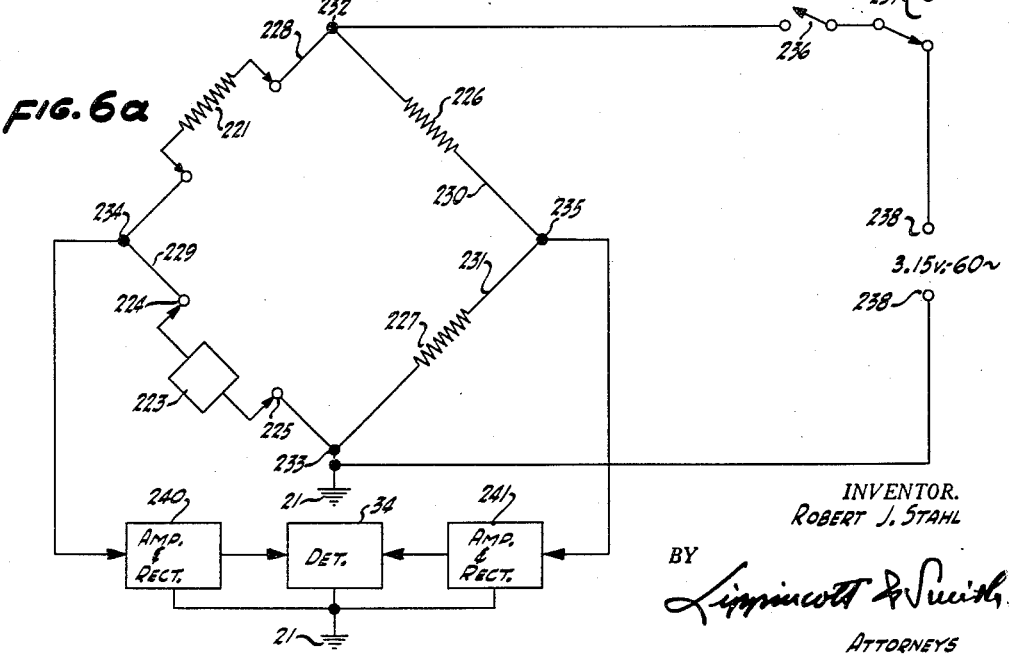
INVENTOR.
ROBERT J. STAHL
BY
Lippincott & Smith
ATTORNEYS

INVENTOR.
ROBERT J. STAHL

Aug. 23, 1960 R. J. STAHL 2,950,437
CIRCUIT TESTING APPARATUS
Filed Aug. 16, 1954 19 Sheets-Sheet 8

INVENTOR.
ROBERT J. STAHL
BY
Lippincott & Smith
ATTORNEYS

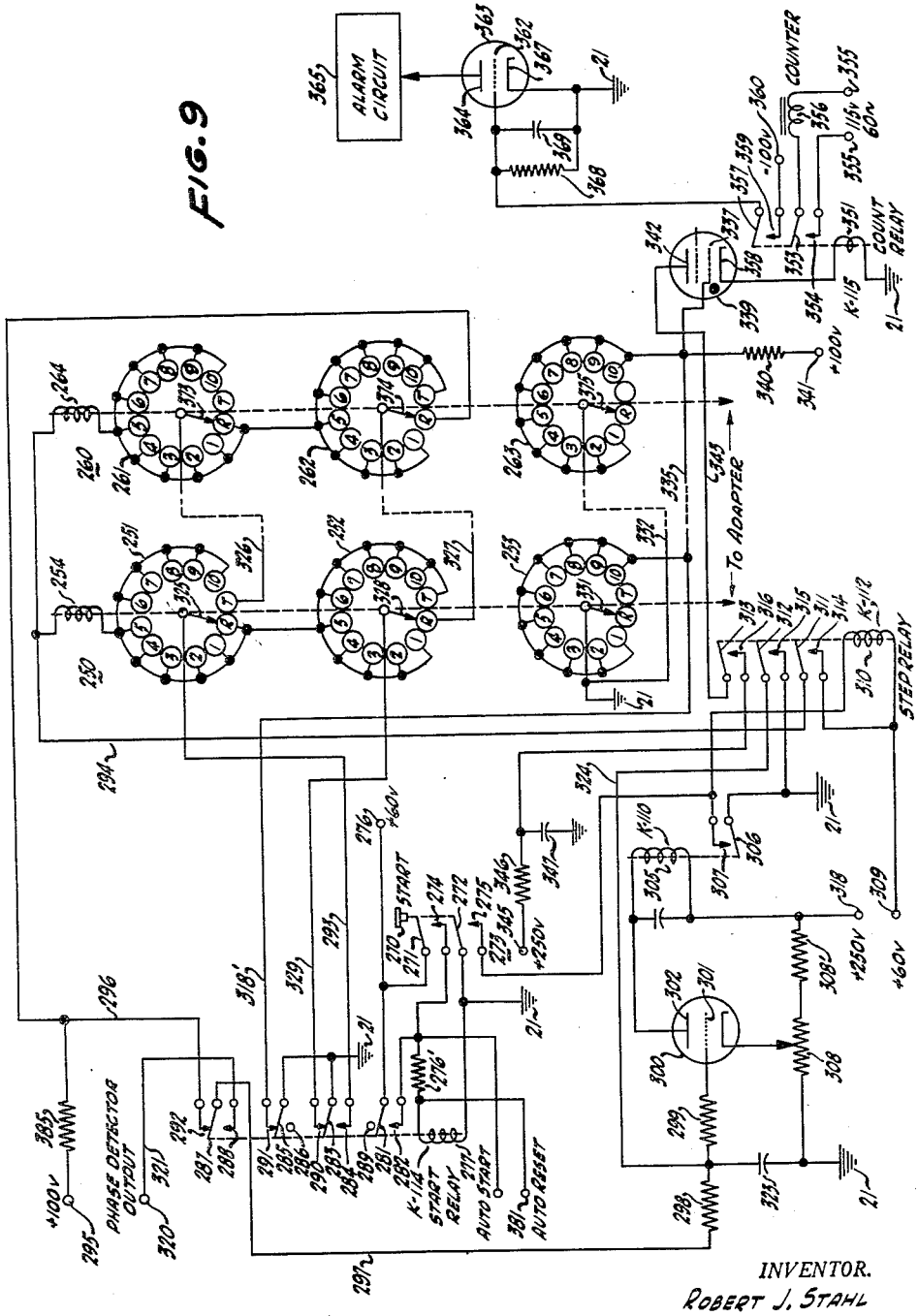

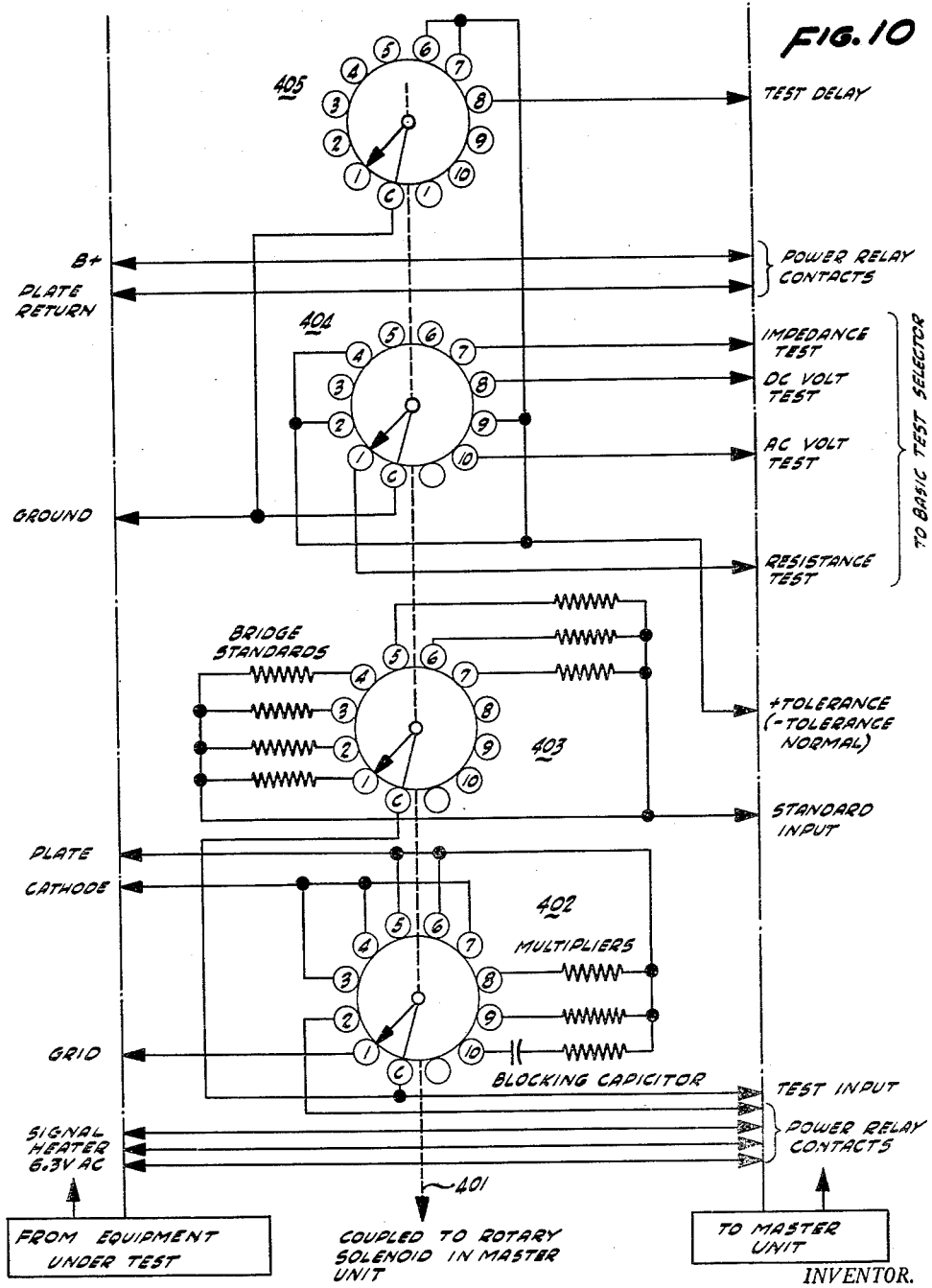

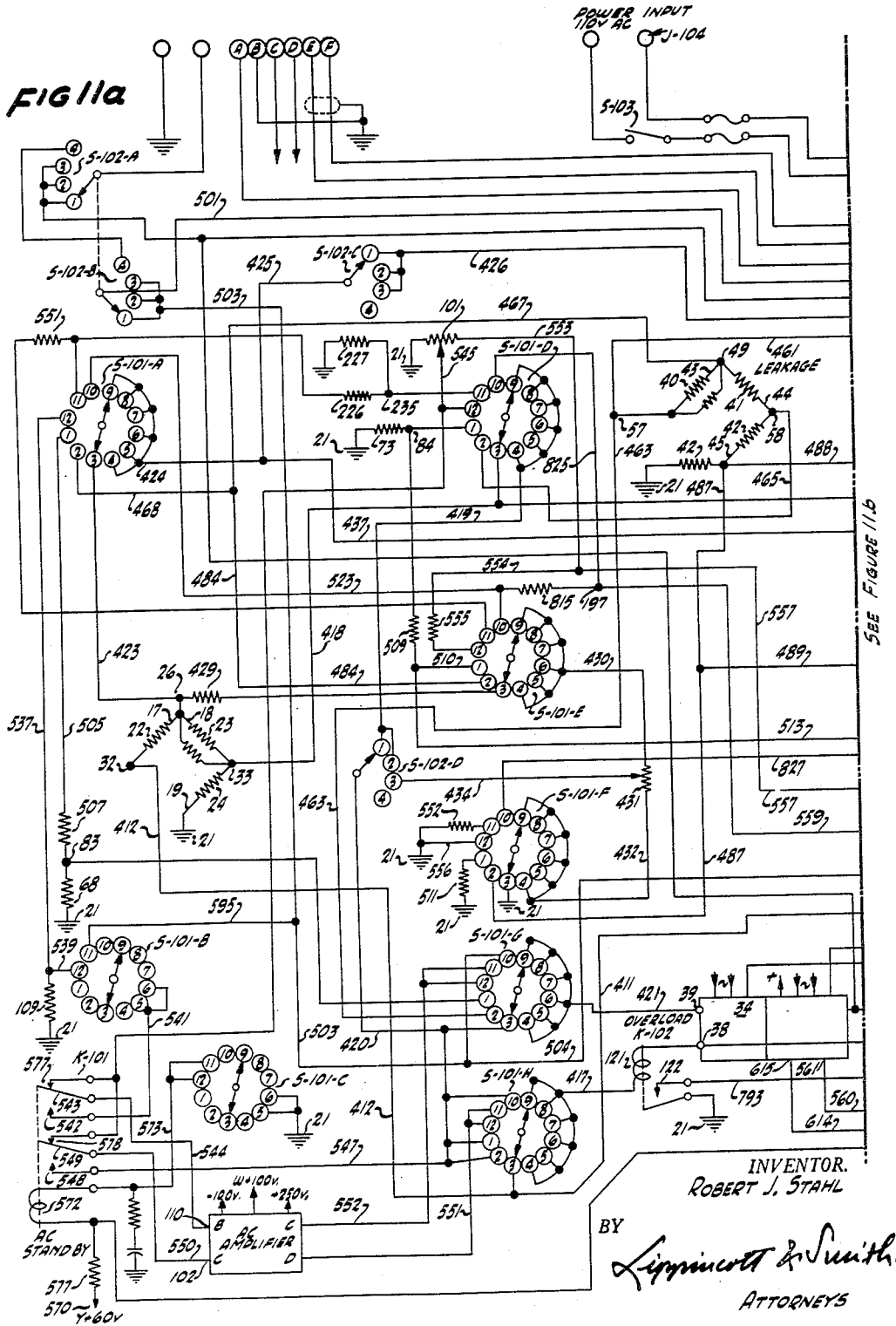

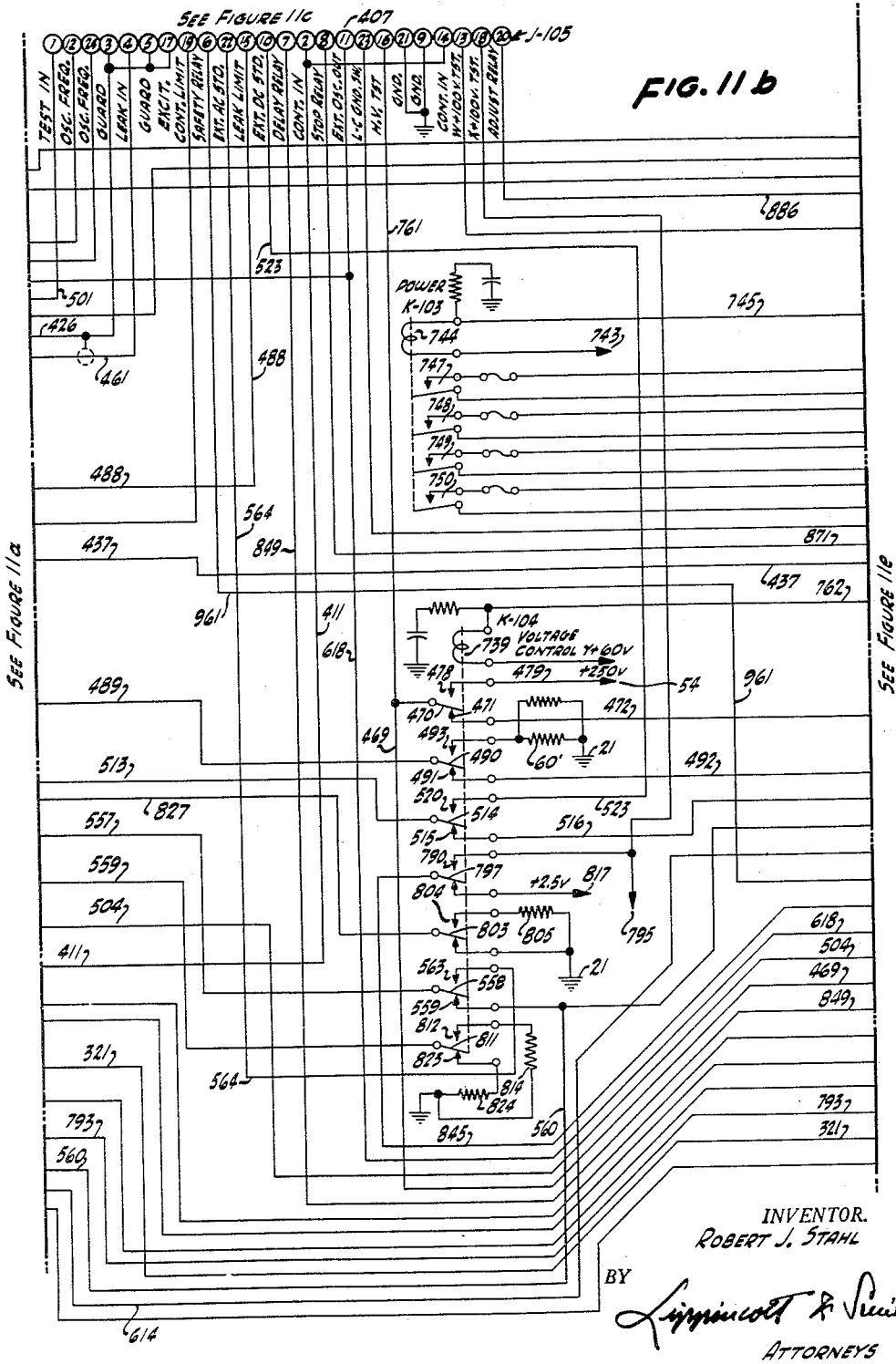

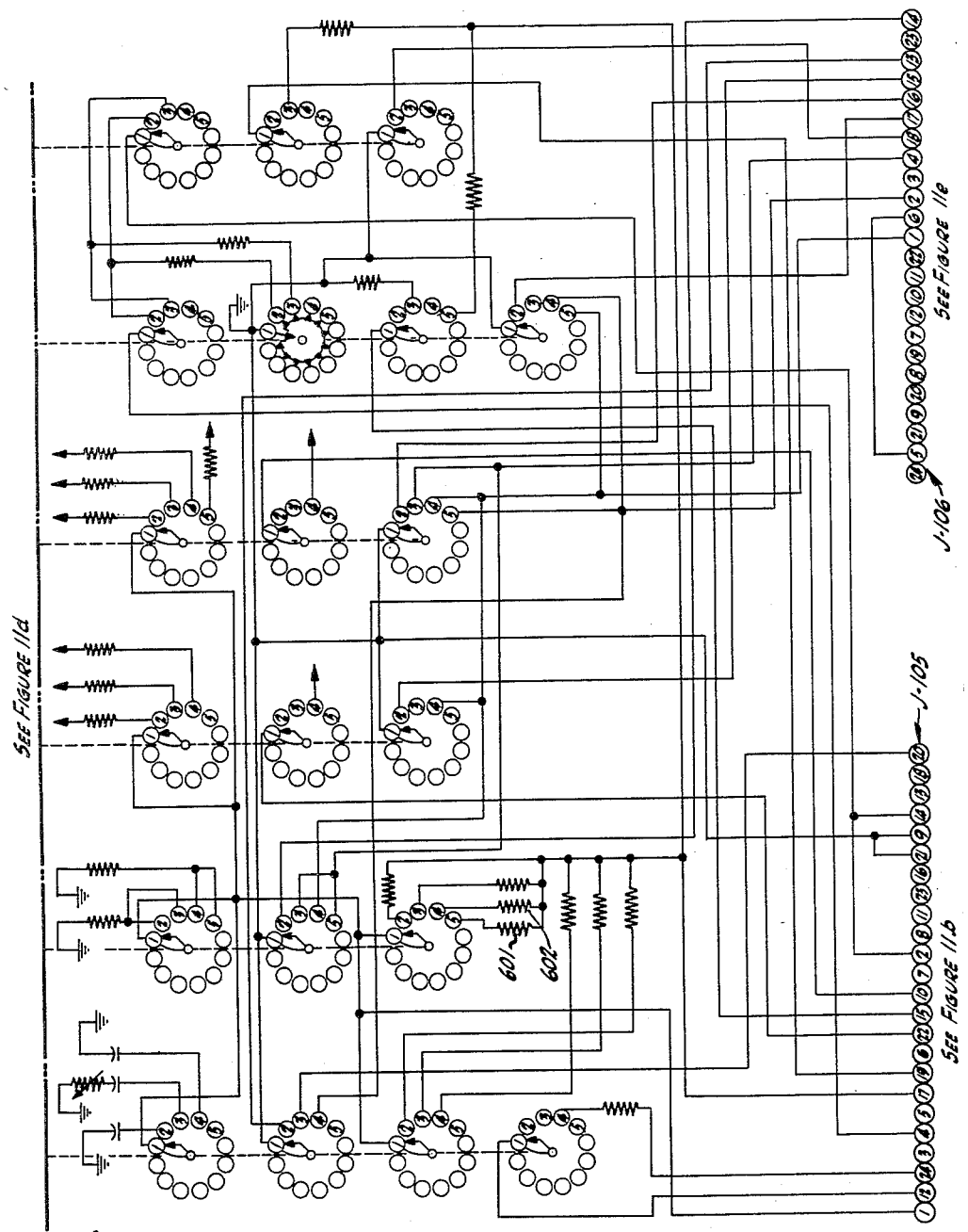

Aug. 23, 1960 — R. J. STAHL — 2,950,437
CIRCUIT TESTING APPARATUS
Filed Aug. 16, 1954 — 19 Sheets-Sheet 14

FIG.11d

INVENTOR.
ROBERT J. STAHL
BY
ATTORNEYS

Aug. 23, 1960 R. J. STAHL 2,950,437
CIRCUIT TESTING APPARATUS
Filed Aug. 16, 1954 19 Sheets-Sheet 15
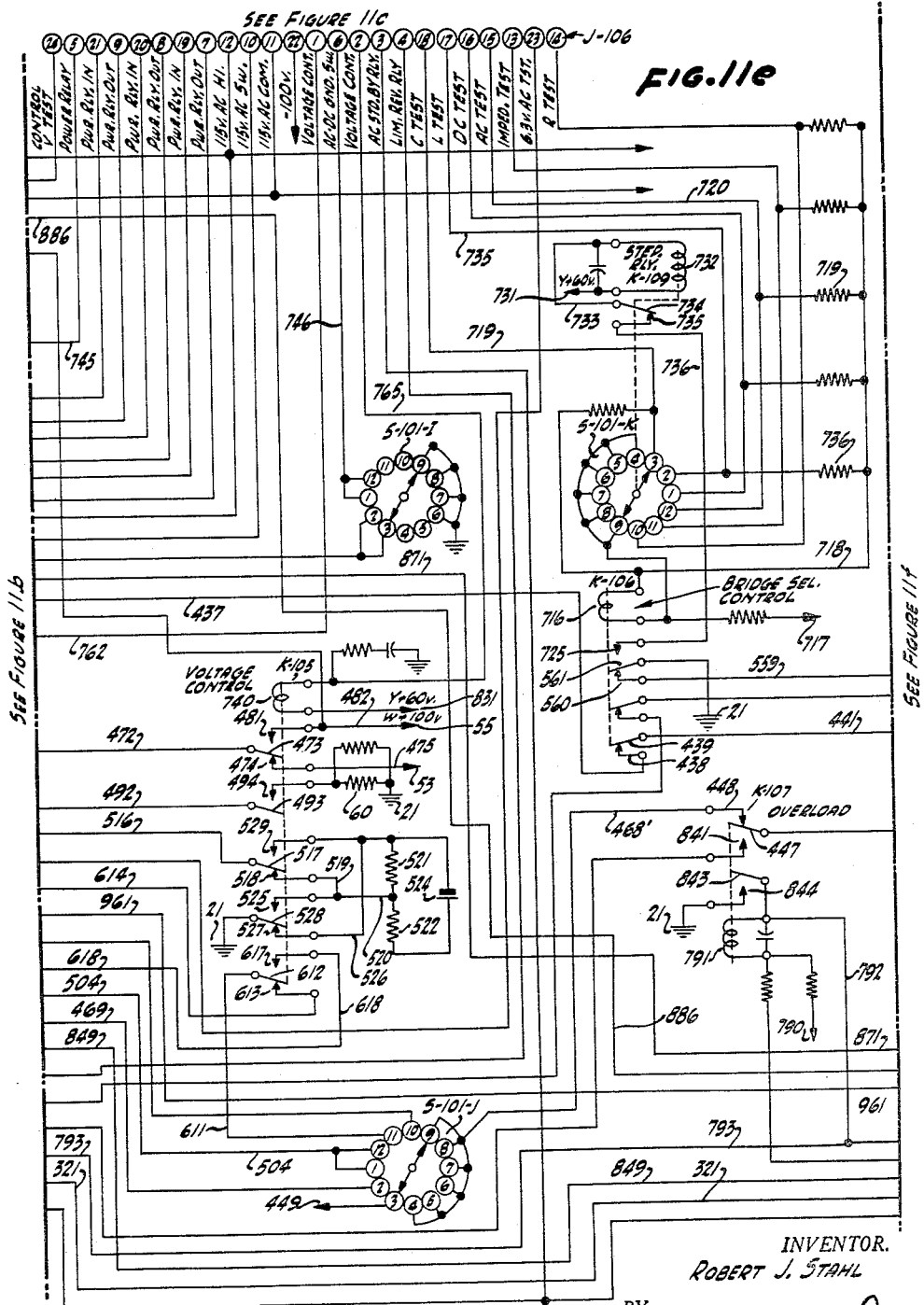
INVENTOR.
ROBERT J. STAHL
BY
Lippincott & Smith
ATTORNEYS

FIG. 11f

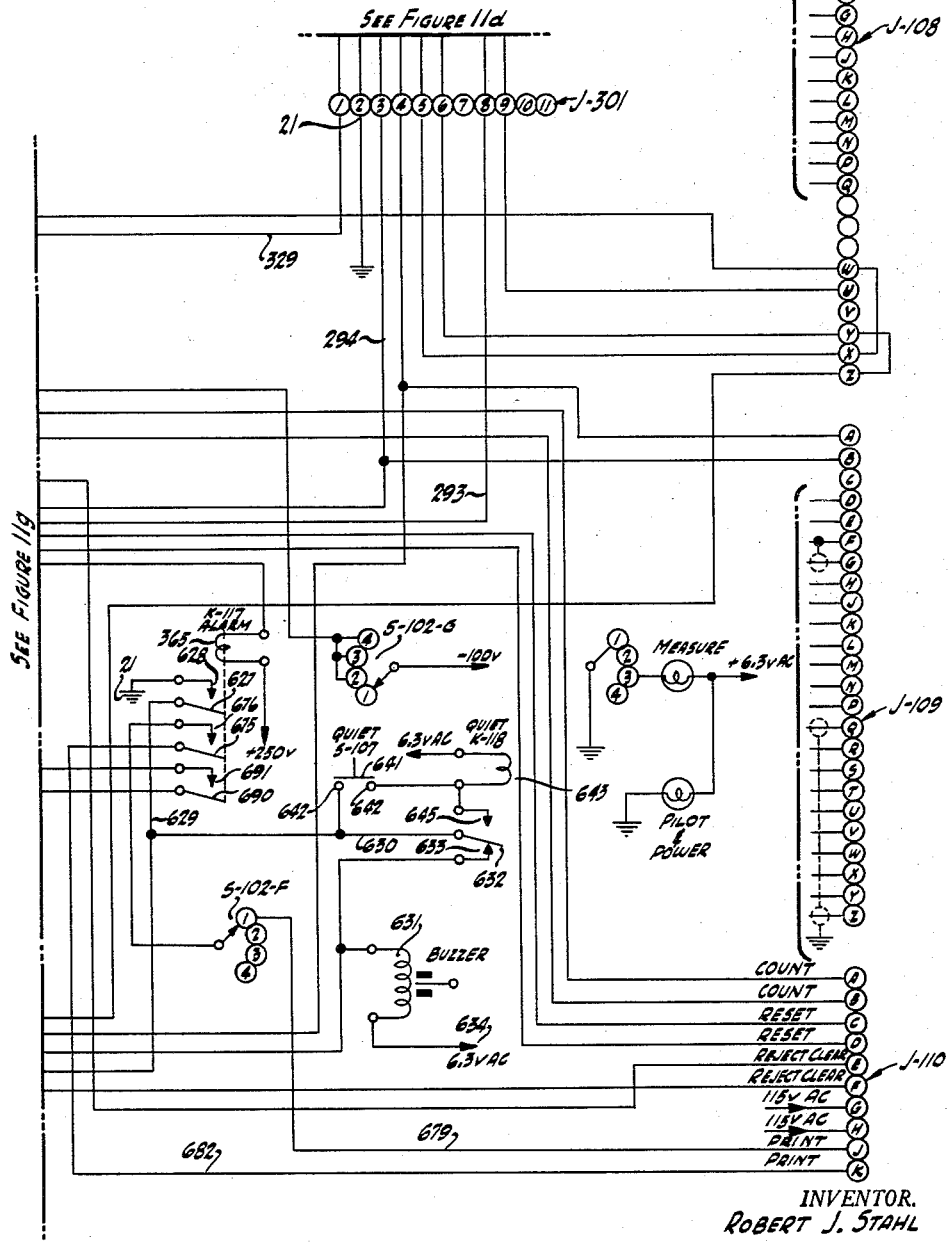

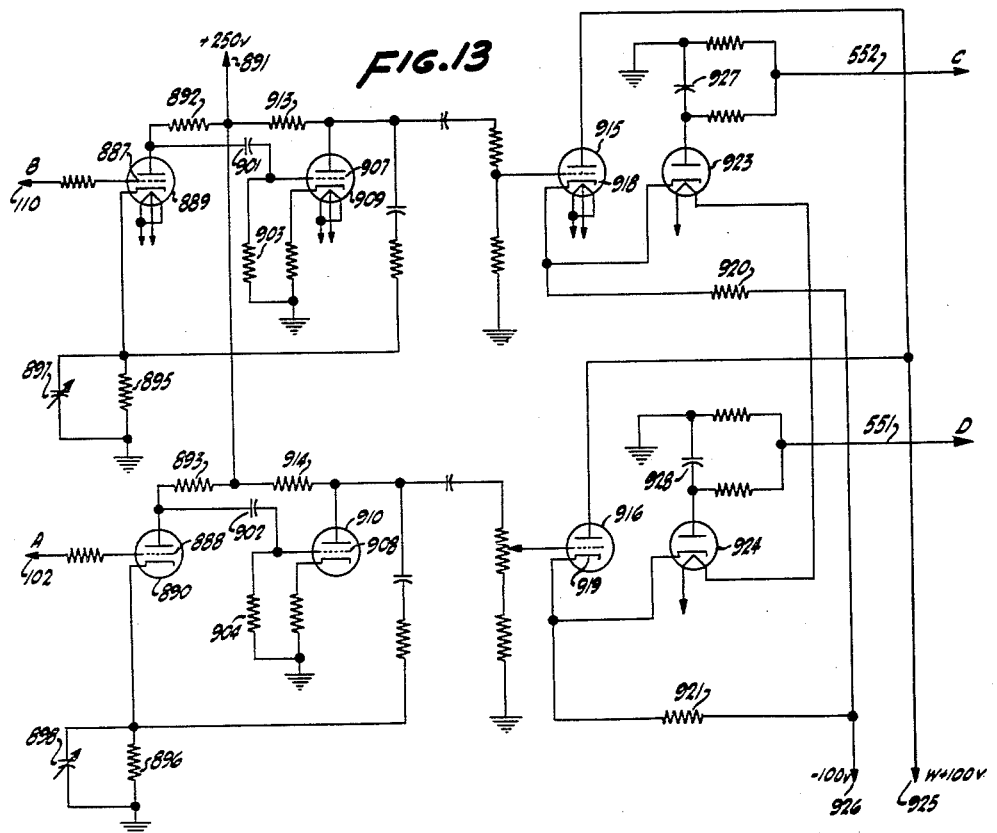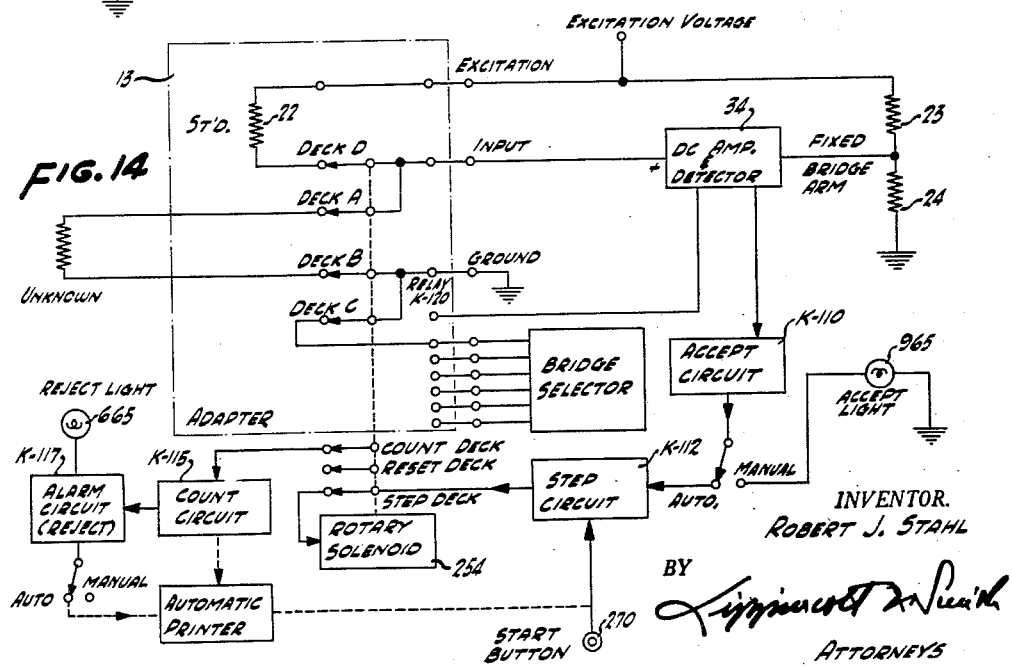

United States Patent Office 2,950,437
Patented Aug. 23, 1960

2,950,437
CIRCUIT TESTING APPARATUS

Robert J. Stahl, Redwood City, Calif., assignor, by mesne assignments, to Textron, Inc., a corporation of Delaware Filed Aug. 16, 1954, Ser. No. 450,001
14 Claims. (Cl. 324—73)

This invention relates to circuit testing apparatus particularly suited to use for automatic testing techniques and elimination of production delays. In its more particular aspects the invention relates to apparatus for automatically testing circuits, and parameters entering into operation of a component to be tested in a continuing sequence of tests conducted in accordance with a prearranged pattern and plan of circuit investigation.

Generally speaking, it is possible, as a result of conducting six basic tests, to cover practically all measurements necessary fully to check the equipment under test and to determine its state of operation and operativeness, as well as the operating parameters of the components of which the circuit is formed. The basic form of testing circuitry herein to be set forth and claimed is of a form and type whereby thorough testing of circuit quality is obtained by a combination of various measurements to be made. In the testing operation wiring accuracy of the circuit under test is checked completely by a combination of circuit continuity and leakage measurements. A wide range of resistance and impedance measurements are used to evaluate nearly all of the circuit components utilized. Operational performance is determined and indicated by a combination of D.-C. and A.-C. voltage measurements.

It is a known fact that practically any quantity to be tested can be resolved or converted into a voltage. By the use of the six tests, above named, it will be observed that practically all circuit determinations may readily be attained. Those tests which cannot be determined initially may be realized by a suitable combination of various measurements obtained by one or more of the tests above set forth, or through relatively simple adaptations or accessories.

In the form in which the apparatus and circuitry will herein be described recourse will be taken to a large extent to a control functioning under the operation of a comparison or bridge type of measuring system. This is because of the high inherent accuracy and adaptability to automation which is thereby afforded. Through using a limit type arrangement all of the basic test circuits are adapted to one general type of measuring element. The apparatus is caused to function under conditions under which there are minimum waveform problems. Further, the majority of basic test circuits are arranged to operate to yield a D.-C. output. This is because a D.-C. voltage is the preferred quantity to measure and simplifies all circuit operations. It is, however, to be understood, in accordance with the invention herein to be set forth and described, that A.-C. voltages and impedances can be equally as readily measured by including, in a suitable manner, a high stability rectifier circuit ahead of the measuring element.

It has been well established in manufacturing techniques that inspection and test is, generally speaking, one of the most expensive labor items in the procedure. Even so, it has not been customary until the present date to apply generally automatic methods to check electronic circuits in the course of production. The apparatus of the type herein to be described aims to provide complete automation and material increases in efficiency, and, at the same time, to check rapidly as to the pirncipal cause of product failure. Failures in apparatus after leaving the manufacturing point can be reduced very substantially by accurate and thorough production testing at the source. The circuitry herein to be set forth makes possible a rapid sequence of checks on wired equipment to determine immediately wiring accuracy, circuit and component characteristics or adjustments, as well as the circuit and equipment performance. Tests of this nature are of great importance and of assistance to the manufacturer, particularly in cases where the manufactured product cannot be operated except in conjunction with other principal units which frequently are not present in the manufacturer's plant. It is, of course, to be recognized that practically any test which can be carried on by an automatic testing device can be carried on manually but, except in the making of extremely simple tests, the manual method is extremely slow to use and usually not well adapted to the job. Still further manual testing requires skilled operating personnel of high caliber which is not necessary with automatic operations.

To set up a testing operation which is specifically designed and constituted to a particular form of operation is extremely expensive and often falls far short of optimum efficiency when manual operations are necessary. The apparatus with which this invention is concerned is intended to provide the desired performance without the use of extensive special design and construction. This apparatus is embodied in two main units. One unit, which may be considered to be the "master," contains all of the basic equipment included among which are numerous control relays and the stepping units to control switching, and also necessary amplifier and control components by which the measurements are effected. The second unit, which may be considered to be an "adapter" or programming unit is designed and arranged for controlling the testing and measurement of the characteristics of a specific piece of equipment by the main unit. The combination provides a mechanized facility for rapid production testing of complex electronic and electrical products.

The components herein to be described involve certain basic test circuits and a suitable measuring element with which the programming or adapter unit is combined, together with an automatic control to cause the units to function in combination. The equipment under test is suitably coordinated to the programming unit and the measuring element provides an indication of the various conditions existing in the circuit under test. If faulty conditions are found to exist in circuitry under test suitable recognition of those effects is given and adequate facilities for safety, adjustment and delay, as necessary, are provided and function automatically.

The measuring equipment is ideally adapted to function to indicate the conditions obtaining either by way of printing or counting and when a faulty condition is found a suitable alarm circuit is brought into operation. The master unit of the apparatus is designed to take care of a series of discrete and predetermined test steps, which are caused to function automatically and in sequence. In those cases where there is a failure of any test in the sequence, the automatic alarm circuitry provides an alarm and gives notice of the defect, in addition to completely suspending operations until said defect is noted by an attendant and the point of failure appropriately recorded, as by an automatic printer. In other instances the test circuits are such that it is possible by making moderate and minor manual adjustments of the equipment under test to continue to advance after the tested circuit has been corrected. The master or controlling unit is one of a sort in which all of the basic mechanical and electrical units are included and concentrated. They are capable of functioning at all times and in any test, and they normally require no operating adjustments or set-up. The programming or adapter unit by which the tests of particular circuits can be carried forward is one which provides a great flexibility of operation and permits the master unit to handle a wide gamut of test products. The control is imparted through the adapter unit in which relatively low-cost components are included so that it becomes possible to build a separate adapter for each different type of product to be tested. Further than this the circuitry herein to be explained is one of a sort in which a special adapter may be used for self-testing in order to permit the main or master circuit to check itself automatically, and also to provide all of the set-ups necessary for the maintenance of adjustments on the main circuit to be operated.

By resorting to the various forms of bridge circuits or variances thereof it becomes possible to minimize the labor required to effect tests. Tooling time is reduced through the use of more adaptable test equipment and set-up time minimized through pre-programmed testing sequences which can readily be inserted into the equipment. The result is that operator time and skill are reduced through automation. Because of the technique of operation herein to be set forth, the circuitry is extremely flexible and subject to wide range capabilities, which make the entire design of a sort in which obsolescence is avoided. The speed of operation becomes an important factor and is high enough to keep pace with the demand and to minimize the number of testers required. In the preferred form of operation the circuit of the testing equipment should preferably have its inherent speed of operation high enough to be limited ultimately by the transient characteristics of the equipment under test. Because of the fact that the most satisfactory form of testing apparatus should not require skilled personnel, the operation of the type herein to be described and set forth is designed to be of the "fail safe" and foolproof type, by which is meant that neither the equipment to be tested nor the tester itself should be damaged by the defects possible of existence in any of the circuitry under test, nor should defective tested equipment be passed in the event of failure within the tester itself. The equipment is also designed to be of a form wherein wiring introduced by the tester itself will not cause the circuitry to be tested to malfunction or the measuring equipment to read spurious signals.

With these thoughts in mind it will be apparent that among the objects of the present invention are those of providing test circuitry of a sort which will meet the needs of the majority of circuits of which the checking may be desired, and at the same time will provide a rapidity of testing operation which exceeds by far anything attainable through manual testing operations.

A further object of the invention is that of providing testing circuitry having a wide range of adaptability.

Other objects of the invention are those of providing a circuitry which may require only an unskilled attendant operating with a greater degree of accuracy and with elimination of the likelihood of human error, and accomplishing the testing in a small fraction of the usual time.

Still other objects of the invention, of course, will be found to be those of providing a trouble-free service life in which the potential exposure and rejection of faulty products is greater than that which is normally to be expected from a manual operation.

Other objects and advantages of the invention, of course, will become apparent from a consideration of the following description in connection with the accompanying drawings wherein:

Fig. 1 is a functional block diagram;

Figs. 2 through 7, respectively, are simplified schematic diagrams showing, respectively, the fundamental circuitry for determining the tests for continuity, leakage, D.-C. voltage, A.-C. voltage, impedance, and resistance. Each of these figures includes parts (a) and (b) of which part (a) is a simplified schematic showing and part (b) includes various components which will relate the operation particularly to the circuitry of Fig. 11 and the several sub-parts thereof;

Fig. 9 is a simplified schematic diagram of the automatic circuit by which the testing operations are carried forward;

Fig. 10 is a simplified schematic diagram of an adapter or programming device wiring, particularly adapted for testing a resistance-coupled amplifier;

Figure 12:
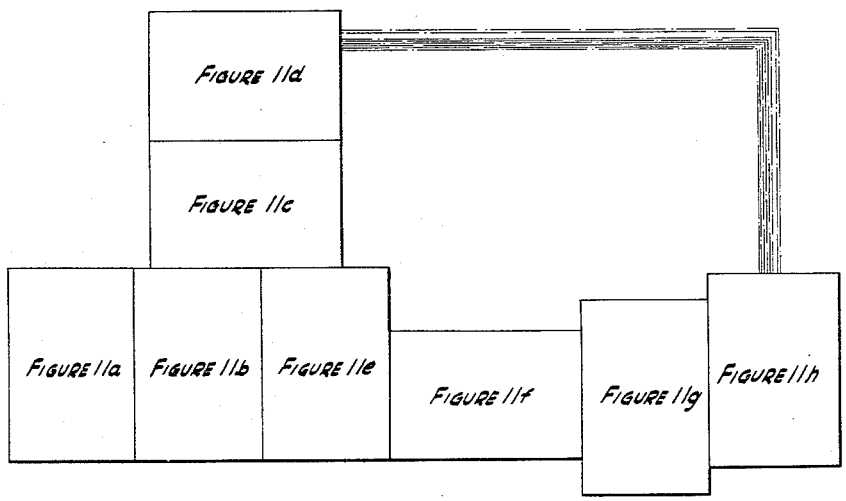
Figure 11F:
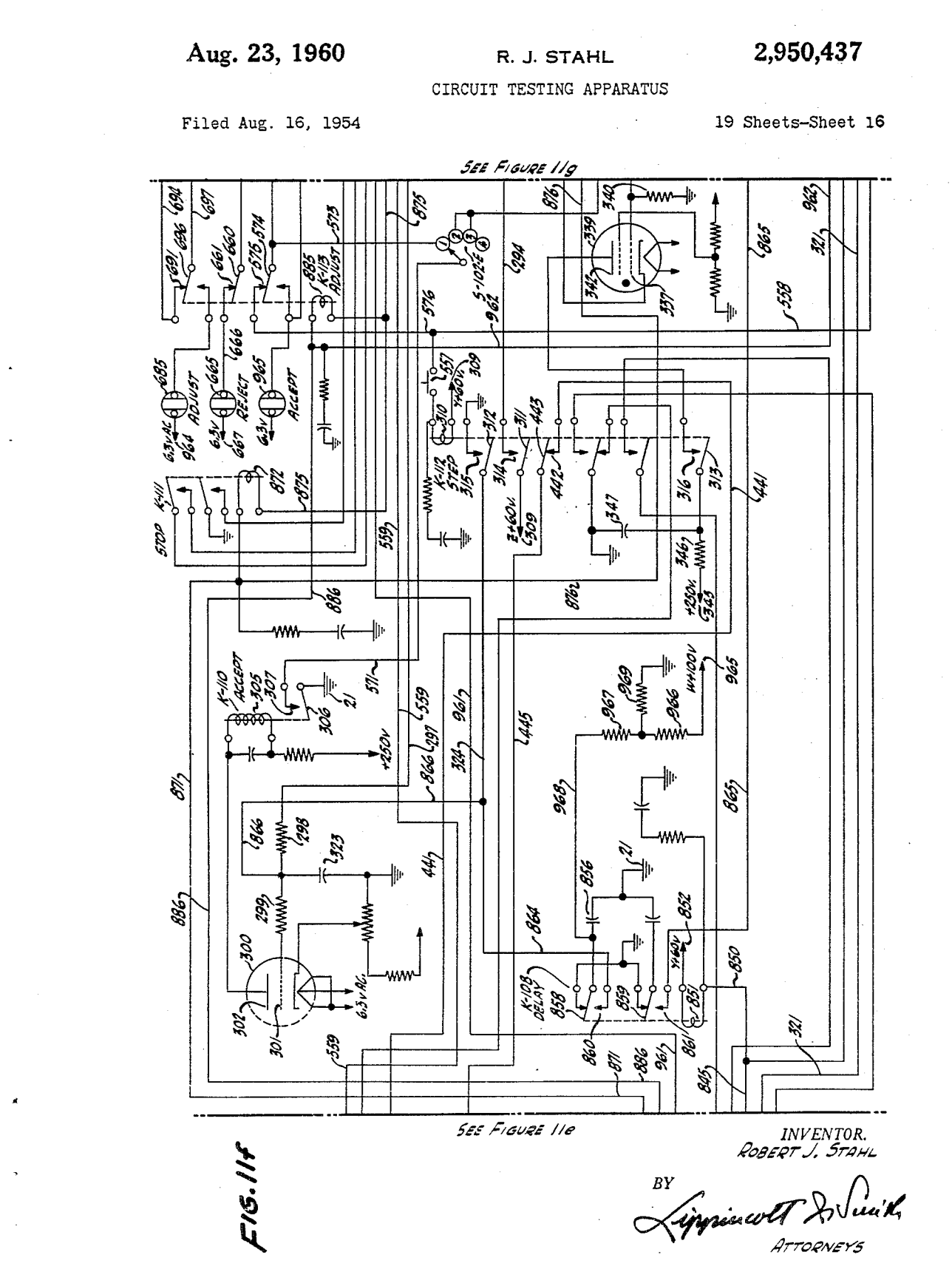
Figure 11G:
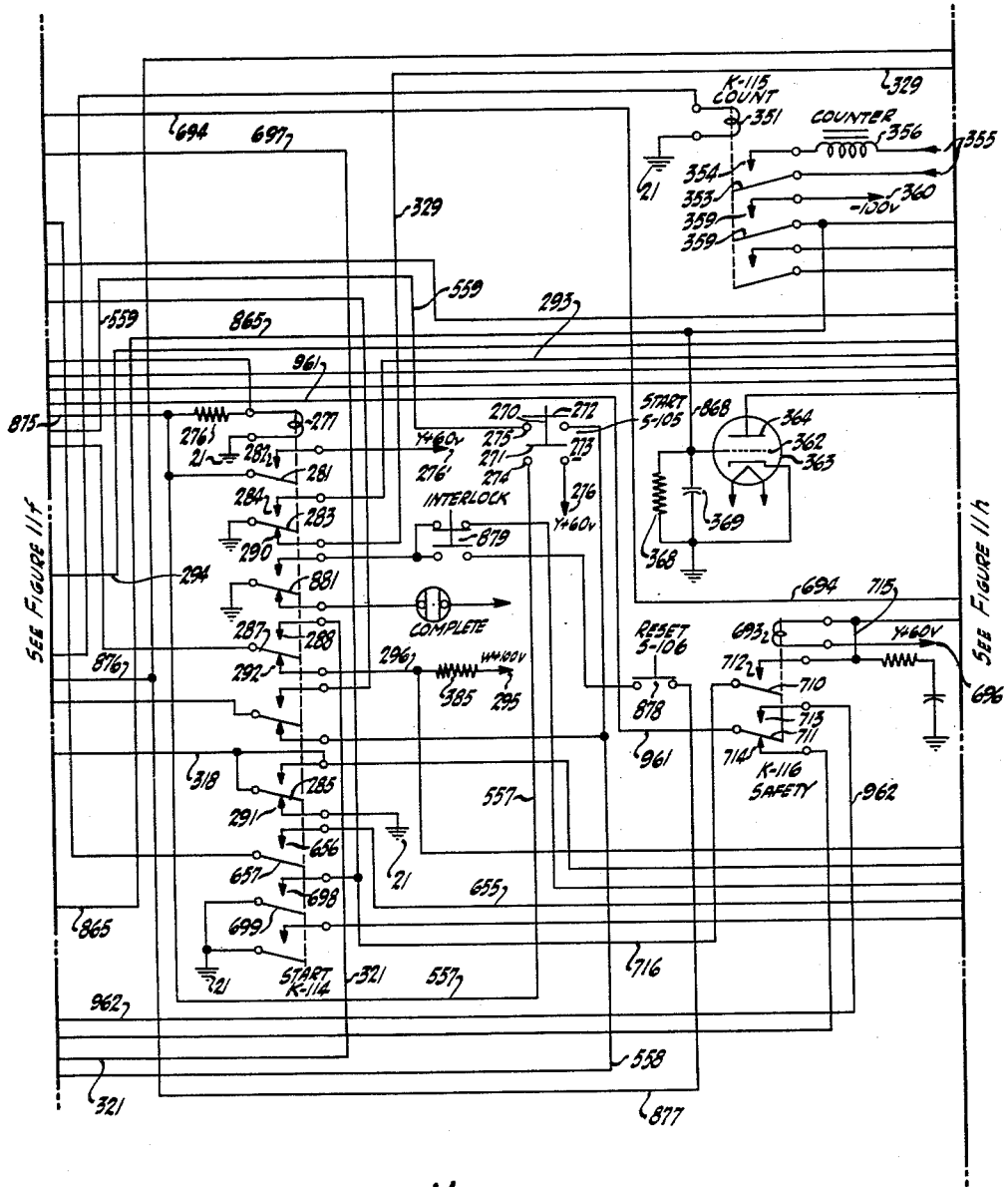

Fig. 11 consisting of parts (a) through (h) is a circuit diagram of one form of circuit suitable for the master unit in which circuit the sequence of components particularly adapted for the testing of continuity (as an example) is exemplified by the heavy outline, it being understood that for making tests of other sorts included within the six hereinabove set forth other circuit paths will be connected by movement of the various switches to different contacts;

Fig. 12 is a diagrammatic representation indicating the relationship of the various component parts of Fig. 11 positioned in appropriate relationship to each other to show continuity of circuit arrangements;

Fig. 13 is a schematic diagram of one form of A.-C. amplifier suitable for use in the circuit shown by Fig. 11, for instance; and Fig. 14 is a functional block diagram to illustrate operational continuity.

Figure 1:
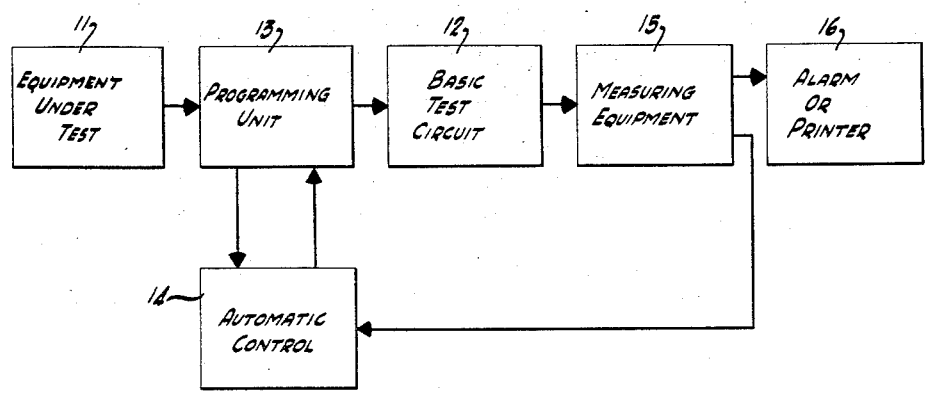

Considering now for illustrative purposes first the functional block diagram of Fig. 1, the equipment under test is schematically illustrated by the block 11. This may be any component or circuit in which various parameters entering into its operation are to be checked or determined. The basic test circuit by which tests are to be carried out is indicated by the block 12. A complete circuit of this type will be found in Fig. 11. Programming of the testing operation is effected by virtue of the conventionally represented programming or adapter unit 13 to which the equipment under test is connected and which unit connects, as indicated, into the basic test circuit. Automatic control for the operation is brought about by virtue of the conventionally represented automatic control unit which, it will be observed, is shown also as connecting to the programming unit. The measuring elements by which the measure of empirical values is provided is shown by the block 15 connected to the output of the basic test circuit 12 and connecting at its output to the automatic control unit 14 and also into a conventionally represented alarm or printer circuit shown at 16.

In the operation of a circuit of this sort the measurement element 15 is one suitable for use with all of the circuits for measuring continuity, leakage, D.-C. voltage, A.-C. voltage, impedance, and resistance, which will herein be termed the basic test circuits. The equipment, in operation, has (as will later be apparent) polarity sensitivity which provides a means for determining whether the test being conducted is above or below some normal value to be established. Consequently, reversing the detector polarity will be seen to be equivalent to reversing the sign of the tolerance limit. The programming unit 13 serves to program the operation in accordance with the task to be performed. Various forms of programming suitable for providing the necessary information in the programming unit may be relied upon included among which may be plug boards, adapting cables, or patch cords, or cards or tape upon which the programming information is recorded, although, as the operation will herein be described, it will be found that the most practical form of programming method is in the form of a group of rotary switches permanently wired with the pertinent test data. Change from one test to another in the sequence is achieved, as will be understood more fully from the description later to follow, by rapidly and sequentially indexing the various switches. The switches are mounted in the adapter and are so designed as to be able to select the circuit to be tested by being mechanically coupled to drive a suitable sort in the circuit tester proper. The result is that a large number of connector contacts are eliminated which would otherwise be required between the work and the usual internal test-selecting devices.

Following the operationl principles outlined for the schematic and functional showing described in connection with Fig. 1 the circuitry later to be explained in detail herein serves to provide for labor minimization through the reduction in tooling and set-up time, operator man hours required for testing, as well as the skill and maintenance time required for the test operation, which are all achieved through automation.

Further than this the testing apparatus based upon the principles of the functional showing of Fig. 1 readily adapts itself to a wide range of forms of work and provides a high operational speed able to keep pace with demands and to minimize the number of testers. In addition, there is a reliability and thoroughness in the operation which far exceeds that of even skilled personnel. With these thoughts in mind the circuitry by which the testing operations are to be carried on is such that it becomes possible to change from one type of work to another with the minimum of set-up time and effort. This is achieved through the use of test circuits included within the basic test circuit component 12 which are not subject to change, whereas, as above pointed out, the programming and circuits peculiar to any one particular operation are permanently assembled in the adapter.

The basic testing operation is set up upon a premise that regardless of the precise manner of making selections and switching between tests, the drive of the selection unit is set up to advance one step upon the satisfactory completion of each test to be made, with the control functioning of the device to be based upon information supplied by the measuring element. The apparatus of testing circuit, particularly from the standpoint of a most efficient time-wise operation, adjusts the rate for stepping to account for the inherent speed of the given test. Illustratively, in case there is a transient condition which could affect the measurement to be made, the rate of stepping between the switching functions should adjust itself to the inherent speed of the test to be undertaken. Further than this, as the switching operation is carried on, the switching positions must be known precisely at all times in order that the information may be made available to the printing device or to an indicator which identifies the test under way, so that the particular test which fails is readily known. This is provided in the apparatus to be described through the use of separate automatic internal switching components, which simplifies the adapter and provides reliable indications.

Bearing these features in mind, the fundamental sort of test circuits to be provided by this apparatus are generally based upon factors which may enable greatest accuracy of the operation. To this end an automatic form of Wheatstone bridge is generally desirable for tests such as continuity, leakage, resistance, and impedance in particular, whereas suitable comparison tests are made for the measurement of voltages for either A.-C. or D.-C. The value under test may be compared to a standard to achieve the desired result.

With these thoughts in mind reference may now be made to the form of circuit by which continuity, for instance, may be established. Illustratively, in the first consideration of the various tests for each of continuity, leakage, D.-C. voltage measurements, A.-C. voltage measurements, resistance, and impedance, the discussion will be directed to the part designated as (a) of each of Figs. 2 through 7, inclusive. To establish a test for continuity reference may first be made to Fig. 2 and to the bridge circuit there shown, and it is to be noted also that the various switches shown by Fig. 11 are also, for illustration, shown in the position for making the circuit continuity test. The continuity test is designed primarily to detect and determine relatively small discrepancies in wiring resistance.

Considering these factors, the bridge circuits used in the test comprises the arms 17, 18, 19 and 20, with the junction of the arms 19 and 20 connecting to ground, as at 21. The arms 17, 18 and 19, respectively, comprise known value resistance elements 22, 23 and 24, all of which may be contained in the master unit or the basic test circuit 12 (see Fig. 1). A suitable source of voltage, represented conventionally by the source 25, is adapted to be connected across the bridge diagonal between the junction of the arms 17 and 18 on the one hand and the arms 19 and 20 on the other hand. The connection is thus established along the diagonal of the bridge between the junction points 26 and 27 through a switching component 28.

The arm 20 of the bridge comprises a resistance element 29, which, in this instance, represents the unknown resistance in the equipment under test. The resistance 29 in the operation according to the circuitry depicted by the various portions of Fig. 11, as also conventionally shown by Fig. 2(b), is switched into the bridge leg 20 by means of suitable switching contacts respectively represented in a schematic manner by the switch terminals 30 and 31. The diagonal of the bridge between the bridge legs 17 and 20 meeting at the point 32 and the bridge legs 18 and 19 meeting at the point 33 includes a suitable detector circuit, represented in Fig. 2 by the block component 34, but described in further detail in the showing of Fig. 8 hereof.

The values of the resistance elements 22, 23 and 24 are determined by choice and are preferably set to reject the component 29 under test when its resistance exceeds some pre-established minimum value. If a limit other than this pre-established value is desired for the resistance, the bridge ratio is altered by connecting either the diagrammatically represented resistors 35 or 35' in parallel with one of the resistors 23 or 24, as the case may be, and depending, for instance, upon whether the limit at which the bridge circuit functions is thereby raised or lowered respectively. In one form of the operation a range of between 0.1 and 5 ohms may be covered in this fashion with an accuracy of plus or minus 0.025 ohm with a detector sensitivity of one millivolt. In the operation, as it will be understood from the further description of Fig. 11, and as can be further seen from portion (b) of this Fig. 2, the switch 28 functions to remove the excitation from the source 25 during any switching operation in order to avoid having it interrupt up to a rather high value of test current.

Figure 8:
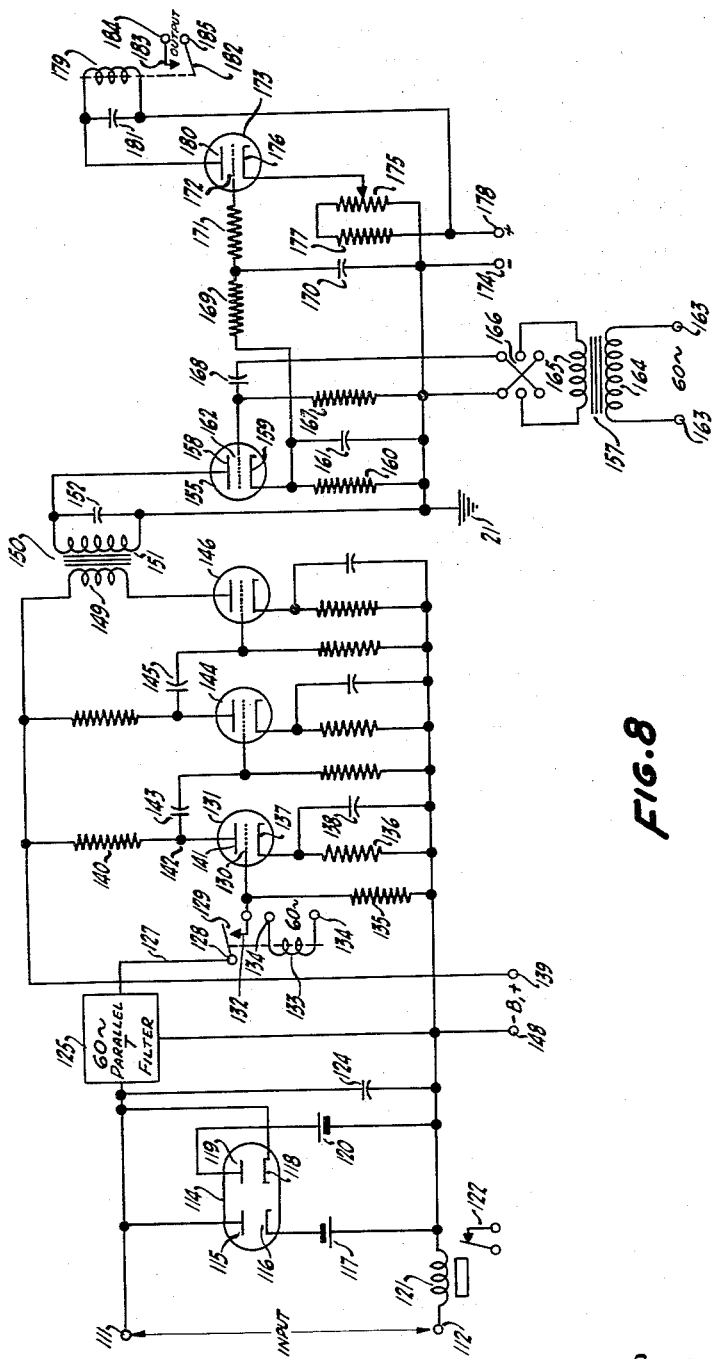
Fig. 8 is a simplified schematic diagram of a detector circuit suitable for use in a testing circuitry as exemplified, for instance, by the circuit diagram of Fig. 11.

The detector apparatus and circuitry which is depicted schematically by the block 34 and which is shown in more detail in the simplified schematic showing of Fig. 8 is so connected that its positive input terminal 39 connects to the junction point 33 and its negative input terminal point connects to the junction point 32 and thus constitutes a component connected in one diagonal of the bridge circuit. For these conditions the input may be considered as applied at the point 32 with excitation applied, of course, across the diagonal between the point 26 and ground 21.

Considering next the test by which leakage, for instance, within the circuit under test can be determined, reference may be made to Fig. 3 and first the portion (a)

thereof. In this figure resistance components 40, 41 and 42 comprise respectively fixed components included in the legs 43, 44 and 45 of a bridge circuit, with the fourth leg of the bridge 46 being adapted to include the resistive component, the value of which is to be checked under test. In a manner similar to that explained in connection with the continuity test of Fig. 2, the junction point 48 at which bridge legs 45 and 46 meet is connected to ground 21. The junction point 49 of the bridge legs 43 and 44 is connected through conductor 50 and a pair of switch components 51 and 52 to various sources of potential each connected with the positive terminal of various voltage sources (not shown) at the points 53, 54 and 55. In each instance the negative terminal of the potential sources is assumed to be grounded by way of the terminal 56. Likewise, for certain functionings there may be coupling between the junction 49 and the guard ring 49'. Also, from the junction point 57 of bridge legs 43 and 46 the detector component 34 is connected in the bridge diagonal to the junction point 58 at which the bridge legs 44 and 45 meet.

In a test by which leakage measurements are to be made, it is desirable, in most cases, that the operation be conducted at relatively high voltage in order to uncover incipient breakdowns, in addition to wiring and component defects. Accordingly, as shown, and as to be explained by Fig. 3(b) and the various parts of Fig. 11 it will be noted that the supplied voltage obtained through switching components (controlled by the voltage control relays K–104 and K–106, as in Fig. 11) is for the majority of operations at the highest value available. The form of bridge circuit represented by the resistors 40, 41 and 42 is connected according to the pattern of the resistors 22, 23 and 24 of the circuit of Fig. 2 within the master unit. The component 47 represents that component or part of the circuit under test which is to be tested. All test voltages are supplied by connecting the switch 52 to one or the other of the terminals 53, 54 or 55, of which the terminal 53 may be considered as operating at the higher voltage, for instance, of the order of 500 volts, while the terminals 54 and 55 are usually supplied with a lower voltage which illustratively may be considered as being of the order of 250 volts and 100 volts, respectively, relative to the ground assumed connected to the terminal 56. The different selected voltages may be established by connecting the switch arm 52 to one or the other of the contacts 54 and 55, which is done where the component ratings of the unknown 47 require this limitation. Switch 51 in the circuit makes it possible readily to remove the test voltage during the course of selector switch operations.

In instances where it is desirable to lower the leakage limit, for instance, from what is usually considered to be a normal value of the order of 500 megohms to a value, illustratively, as low as ten megohms a further resistor diagrammatically shown at 60 may be suitably connected to shunt the resistor 42 in the bridge leg 45. It frequently happens in the leakage test that capacitance, such as conventionally shown in dotted outline at 58', shunts the part 47 under test. Transients are then introduced but are usually made short by maintaining the value of the resistance 40 in the leg 43 at a generally minimum value. In one form of operation for the establishment of the leakage the values of the known resistors 40, 41 and 42, respectively, may be considered to be approximately 20,000 ohms, 40,000 ohms and one megohm, respectively.

Next, a test whereby D.-C. voltages may be measured and established initially may be considered by making reference to the portion (a) of the showing of Fig. 4. The unknown voltage is connected in the switching operation to input terminal 65 from the equipment under test. This unknown voltage is then supplied through a multiplying resistor 66 having approximately 20,000 ohms per volt drop so that the loading may be considered as being generally similar to that imposed by the various multipurpose meters used by technicians. The voltage is then supplied through a selector switch schematically represented at 67 to be supplied to the detector unit 34 across the input resistor 68 which connects to ground at 21. The resistor 66 is usually set to include the tolerance limit of the system and the selector as a whole is protected by the switching component 67. The switch designated schematically at 69, which is to be further explained provides the correct polarity of the D.-C. voltage which is to be supplied to establish the measurement from the schematically indicated D.-C. source 524 having, illustratively, its positive terminal connected to the switch terminal 71 and its negative terminal connected to the switch terminal 72. The detector 34 also connects across the resistor 73, which has one terminal grounded. The terminal which connects into the detector is also connected to the switch 74 having one switch contact 75 arranged to supply voltage from the source 524 into the detector. When the switch armature is placed upon the contact point 76 voltage is supplied from an external source (not shown) which connects to the terminal point 77. The switch terminal 75 connects to the armature 78 of a switch, which in one position contacts the terminal 71 and connects the positive terminal of the source 524 to the detector and by virtue of a second switch armature 79 of the switch 69 which operates in conjunction therewith. Simultaneously a connection of the negative terminal of the source 70 is made to ground 21 via the contactor 72. When the switch armatures 78 and 79 of the switch 69 are thrown in the reverse position to contact terminal points 80 and 81, respectively, it will be observed that the negative terminal of the source 524 is connected to the detector 34 via the terminal point 80, the switch armature 78, the contact point 75, and the switch 74, while, in this position, the positive terminal of the source 524 is connected to ground 21 through the terminal point 71 and its connection to the terminal point 81 and the switch armature 69. This switch sets the desired polarity of the voltage to be measured.

Under these circumstances the detector then determines, as will be seen from a further showing and the description of Fig. 8, particularly, the relative values of the input voltage available at the terminal 65 and its comparison with the source 524. In cases where it is desired to compare an externally supplied voltage the comparison is obtainable by moving the switch 74 to its upper position against the contact point 76 for a ratio or differential measurement. With the circuitry shown a range of one to one thousand volts may be handled for normal circuits, although higher voltages, when required, are usable with the aid of suitable voltage dividers. Lower voltages can be determined and accommodated at decreasing accuracy through the connection at the external standard connection point 77 of a known low voltage of similar magnitude.

The operation of the circuitry above explained will become more apparent from a consideration of the showing of the operation of the detector circuit (see Fig. 8) later to be explained. For these conditions of operation the input of detector 34 is provided between the terminal points 83 and 84, at the former of which the voltage from the unknown source becomes available, and at the latter point of which the voltage from the known source or the external standard becomes available. The detector thus serves to compare the unknown voltage with a standard value.

The simplified diagram of Fig. 5, representing the manner of providing the A.-C. voltage test, may next be considered. The circuitry diagrammed by Fig. 5(a) is such as to permit both an absolute and a ratio (gain, etc.) determination throughout the audio range. In accordance with the proposal previously set forth the components herein to be described are so designed that the previously mentioned A.-C. amplifiers and rectifiers convert the impressed signals to the required D.-C. signal for which the measurement is achieved. As shown by Fig. 5, when the switch 95 is thrown against the lower contact point 96, it is adapted to connect a reference standard indicated by the source 97 connected with one of its terminals grounded at 21. The other contactor to the switch, which is contacted by the switch armature in its upper position against the contact point 98, provides a suitable rectified external standard, derived from an external source (not shown) connected at the terminal point 99, supplied across resistor 101. The amplifier and rectifier 102 in this showing is purely conventionally represented. Depending upon which position the switch 95 selects either the A.-C. applied from an external standard connected from the point 99 or the standard supplied by the component 97 is connected to one input of the detector, conventionally represented at 34. The detector in a more specific form is shown and will later be described particularly in connection with the circuit of Fig. 8.

There is also supplied at the terminal point 105 an input of A.-C. voltage derived from the equipment under test. This voltage is supplied through a suitable resistor 107 (usually contained in the programming or adapter unit) and a switch 108 so as to be impressed across the input resistor 109 to the amplifier and rectifier, conventionally represented at 110, whose output is also fed to the detector 34. At this point it may be appropriate to make reference to the detector circuit of Fig. 8 illustrating in simplified schematic form the type of detector herein incorporated, since the component is used in all tests described.

This detector unit 34 has its internal input terminals 111 and 112 (corresponding to external terminals 38 and 39 as in Fig. 2) connected to receive the supplied signals from each of the standard sources and the equipment under test. The input terminals are shown herein as floating with respect to ground because of the general requirements of the test. So connected, the input signals are supplied to a limiter tube 114 which is in the form of a double diode and which is biased appropriately to limit the input signals to some predetermined maximum voltage. One half of the double diode 114 comprises the anode 115 and cathode 116, the latter of which elements is suitably biased positive relative to its anode by the indicated bias source 117 poled with its positive terminal toward the cathode. In this showing, as in all of the figures, no cathode heating elements are shown but it will be understood that any suitable heating is provided, as is well known in the art.

The second half of the double diode 114 is connected oppositely so that the cathode element 118 is connected to the input terminal 111, as is the anode 115 of the other diode. Likewise the anode 119 of the second diode member within the envelope 114 is connected to the input terminal 112 through a suitable biasing source, conventionally represented at 120, poled with its negative terminal connected to the anode. Current flow from the input 112 terminal point flows through the relay winding 121 of the overload relay K-102 (see Fig. 11). The relay 121 functions as an overload relay and operates in accordance with the current flow through the tube 114, to close the switch contact 122 if the overload is of sufficient magnitude and duration. In this way the apparatus operated upon and the entire testing apparatus is protected from damage through a control of a second overload relay (see Fig. 11) operated to control the operation.

The capacity element 124 is connected to shunt the two diodes to reduce the effects of transients, hum and noise. A suitable filter, which may be of the well known so-called parallel-T type, well known in the art, is connected to receive the voltage which has passed upon the limiter 114. The operating parameters of the filter 125 are chosen so that it attenuates any 60-cycle pick-up. Current flowing in the output of the parallel-T filter and which is derived between the conductor 127 and the terminal point 128 connecting to a switch armature 129 is caused to be supplied to the input or control grid electrode 130 of a first amplifier tube 131 in accordance with the making and breaking of contact by the armature 129 contacting the switch terminal 132. The switch armature 129 contacting the terminal 132 operates as a chopper, with the armature being controlled in any suitable fashion by means of the coil of winding 133 which is connected at the terminal point 134 to any appropriate source of alternating current (not shown) such as a 60-cycle A.-C. supply line.

The input signal to the amplifier 131 is then applied across the input resistor 135, the tube being appropriately biased by the resistor 136 connected to the tube cathode 137 and suitably by-passed by the capacity 138. Operating voltage from the source (not shown) for the tube 131 is applied from a terminal point 139 and through a plate or load resistor 140 to the plate 141. Output signals are derived across the tube load resistor 140 and is available at the terminal point 142 to be supplied to a plurality of subsequent amplifier stages of similar characteristics connected through the coupling condenser 143 to a second amplifier tube 144 and thence through a coupling condenser 145 to a third amplifying tube 146, the connections to which and the operation of which need not be further explained in view of the well known resistance-capacity form of coupling of amplifier stages, as shown.

It will be observed that by means of the chopper action provided by the winding 133 causing the armature 129 to contact the terminal point 132 and then be removed therefrom at the frequency of the exciting source, serves to convert the low-voltage direct current available between the conductor 127 and the point 128 into 60-cycle pulsating current so that it can be conveniently amplified by the tubes 131, 144 and 146. The amplifier section, in the form shown comprising tubes 131, 144 and 146, is floating with the positive voltage applied to the various tube plates being connected between the terminal point 139 (illustratively for the positive connection) and the terminal point 148 (illustratively for the negative connection). The output from the last tube 146 of the cascade is supplied through the primary winding 149 of the transformer 150, and thence into the transformer secondary winding 151, which is suitably tuned by the capacitor 152. This output is connected to grounded equipment with the ground 21 being shown connected to one terminal of the transformer secondary.

The tube 155 functions as a phase detector tube and develops a positive direct current voltage when the plate signal voltage (as available through transformer 150) is in phase with a 60-cycle grid voltage reference signal supplied by way of a transformer 157. The ungrounded terminal of the transformer secondary winding 151 is connected to the plate or anode 158 of the tube 155 whose cathode 159 is grounded through the cathode bias resistor 160, by-passed by the condenser 161. The tube control grid 162 is supplied with appropriate 60-cycle voltage derived from a source (not shown) connected to the input terminals 163, which, in turn, connect to the primary winding 164 of transformer 157. Transformer 157 has its secondary winding 165 connected through an appropriate switch, conventionally designated at 166, to supply A.-C. voltage by way of the resistor 167 and capacitor 168 to the grid element 162. The switch 166 serves in its two positions to reverse the phase of the impressed alternating current voltage available at the terminals 163. Consequently it will be appreciated that the reversal of phase of the impressed alternating current available at the terminals 163 merely serves to reverse the sign of the tolerance under control of the adapter unit, later to be described.

The output from the phase detector tube 155 is derived as the tube cathode output across resistor 160 and is supplied through the resistor 169 and across the condensers 161 and 170 through the dropping resistor 171 to the control electrode or grid 172 of a relay amplifier 173. Suitable biasing voltage for the tube 173 is applied from a source (not shown) connected with its negative terminal toward the terminal point 174. The combination of the condenser 161, the resistor 169 and the condenser 170 serves as a low-pass filter for the output of the tube 155, prior to the time this signal voltage is impressed upon the input of the relay amplifier tube 173.

The cathode bias for the relay amplifier tube 173 is set by the potentiometer 175 connected by means of its tapping contactor to the cathode element 176, with the potentiometer being connected in series with a resistor 177 which connects at its free terminal with a source (not shown) of suitable plate or anode voltage for the tube 173. The source of anode voltages is connected at the terminal 178, and through the relay winding 179 it is supplied to the tube plate or anode 180. The relay winding 179 is shunted by a suitable condenser 181. When current flows in relay winding 179 the armature 182 is caused to close upon the contact point 183.

In the operation the bias in the tube 173 is so set that the relay armature 182 is just caused to close at a suitable selected voltage input to the limiter 114, which input voltage is set at a suitable value designed to establish an optimum adjustment between sensitivity of the equipment and stability. An input polarity from an acceptable test develops a signal through the chopper 129 which is in phase with the reference voltage supplied to the input or grid electrode of the tube 155, and this produces a positive voltage which overcome the bias established on the tube 173 and thereby causes energization of the relay winding 179 to close the armature 182. The closure of the relay armature 182 against the contact 183 provides at the output terminals 184 and 185 the connection of a suitable voltage which is of a value sufficient to initiate a complete stepping signal in the automatic equipment by which the various sequence of tests is established. If there be an input polarity from a reject test the voltage developed is in opposite phase to the signal and thus can produce no utilizable output from the phase detector.

Various circuits may be used to achieve automation and one such form has been shown in Fig. 9 of this application. However, for reference purposes this operation will be discussed at a point in this description following a complete description of the manner for providing for the so far undescribed tests for resistance and impedance, it being understood, of course, that these tests may be considered in any desired and preferred sequence and that the particular form of test is determined in accordance with conditions set up in the adapter unit to meet the needs of a particular operation.

To make the resistance test the circuitry is set up in the form of a bridge, as shown in Fig. 7, with the bridge arms contained within the master unit caused to comprise the resistors 191 and 192 or 193, the latter two of which are individually selected illustratively by a switch or contactor 194. In this form the resistor 191 will form a leg 195 of the bridge with the adjacent leg 196 including either the resistor 192 or 193. These bridge legs meet at the junction point 197, with the free end of the leg 195 terminating at the terminal point 198 and the free end of the leg 196 including either resistor 192 or 193 terminating at the point 199 which, in turn, is grounded at 21.

The remainder of the test bridge for establishing the resistance test comprises bridge legs 201 and 202 of which the former includes a standard value of resistance represented at 203 which is contained in the adapter or programming unit interposed between the apparatus to be tested and the master unit. The resistor represented at 204 is indicative of the resistance component in the equipment to be tested for which information as to its value is desired. Bridge leg 202 connects at one end to the terminal 199 and joins to the adjacent leg 201 at the terminal point 205. Excitation to the bridge is provided by way of the connection at the terminal 198 through the switch components 206 and 207 of a suitable source of voltage whereat one terminal point 208 there is a connection made to a terminal point 209 of one suitable voltage. A second point 210 connects to a voltage source of a higher magnitude which is applied to a contact point 211. The supply voltage is preferably grounded at its negative terminal by the connector point 212. The magnitude of source voltage is selected in accordance with the range of resistance values to be measured.

In this form of the operation it will thus be observed that the excitation voltage is supplied across the bridge diagonal between the points 198 and 199. The input is made available at the terminal point 205. The D.-C. amplifier and phase detector 34 is then connected with its terminal points 38 and 39 respectively joined to the points 197 and 205 on the bridge.

Reference may now be made to Fig. 6 and first to part (a) thereof for an understanding of the manner in which the measurement for impedance is determined. Here also a bridge circuit is provided, with the standard value of resistance represented at 221, which may be considered to be included in the adapter unit. In Fig. 6(a) only one such standard value of resistance is shown although, of course, it is to be understood this is again merely illustrative. The equipment under test is considered to be an impedance which is represented by the block 223 which may be an inductor element or another form of impedance element which may be connected into the bridge circuit by the switch arms 224 and 225 in accordance with the tests to be conducted. Fixed and known values of resistance represented at 226 and 227 will comprise the other two legs of the bridge. In this form, as shown by Fig. 6(a), the resistors 221, 226 and 227 and impedance 223 may be considered to form respectively bridge legs 228, 230, 231, and 229, with the legs 228 and 230 meeting at the junction point 232 and legs 229 and 231 meeting at the junction point 233, to be grounded at 21. Bridge legs 228 and 229 join at the point 234, with bridge legs 230 and 231 joined at the point 235. Excitation for the bridge circuit is supplied across the diagonal between the points 232 and 233 (i.e., ground in this showing) by way of the connections thereto of the switch components, conventionally represented at 236 and 237. With the switch 236 closed and the switch 237 shown in its indicated position, suitable voltage from a source, preferably of 60 cycles A.-C., which is connected across the terminal points 238 may be supplied to the bridge. When switch 237 is thrown over against its upper contact point, with the switch 236 in its closed position, voltage from a suitable oscillator (not shown on this figure) which is supplied at the terminal 239 is connected as the exciting voltage upon the bridge.

There is connected across the opposite diagonal of the bridge between the points 234 and 235 the measuring apparatus by which the obtained output may be caused to register the magnitude of the impedance to be measured. In this form of arrangement the terminal points 234 and 235 respectively connect to suitable amplifier and rectifier elements 240 and 241, which will be particularly described as to their nature and functioning in connection with the description of Fig. 12 hereof, it being understood that these components are essentially amplifiers of alternating current and rectifiers which may supply the output voltage therefrom to a suitable D.-C. amplifier and phase detector conventionally represented at 34 and of the general form described in connection with the component of like number referred to in all of Figs. 2 to 6, inclusive. This device is further exemplified by the showing of Fig. 8.

In its essence the impedance bridge is a circuit which is preferably so designed that a vector balance is not required. This is important in that it permits the use of a resistor element 221 as the standard and the inconvenient reactive components are thus, for the most part, avoided. The diagrammatically represented amplifier and rectifier components 240 and 241 supply the D.-C. detector inputs with all phase response from the system removed. The result is that a null is produced whenever the scalar values of the two A.-C. bridge outputs are equal. For establishing the tests of the sort herein to be described the bridge arms 230 and 231 may be considered to be the permanent arms and the division of the resistance values 226 and 227 is preferably set up in such a way that the resistance 227 compared to the resistance of the resistance components 226 and 227 in series is proportional to $1/\sqrt{2}$. Balance is produced whenever the resistance 221 equals the impedance 223 provided the unknown impedance represented by 223 is a pure reactance, such as a capacitor.

In this impedance measuring bridge scalar balance is made possible beacuse the A.-C. output from each side of the bridge is rectified before being applied to the detector 34. The result is that any phase angle developed by the impedance under test is lost in the rectification process and only the magnitude of the bridge developed voltage remains. Note should be made that, of course, the amplifiers should have stable and balanced characteristics in this form of operation.

With this preliminary consideration of the various circuit components which are adapted to be connected through the functioning of the master unit, and prior to discussing the circuit as a whole, reference may be made to the automatic circuit shown by Fig. 9 which exemplifies the preferred form of mechanism or circuitry to achieve automation. It will be understood in considering Fig. 9 that for the reasons of presenting the essential features of the operation numerous details, which will be found to be present in the circuit shown by Fig. 11 and its separate parts, are omitted. These omissions include such components as printers, spark suppression, manual provision for range changing circuitry and certain of the safety elements.

Switching in accordance with the arrangement of the automatic circuit Fig. 9 is accomplished by the aid of a multiplicity of rotary solenoids, the number of which may be in any selected range independent upon the number of test operations to be conducted. In one form of the apparatus used it has found desirable to use a plurality of forty such rotary solenoids which illustratively may be of the so-called "Ledex" variety, as manufactured by the G. H. Leland Co. For convenience of illustration only two such rotary solenoids have been illustrated by Fig. 9 although the break between a considerable number of such components is indicated by the dotted lines connected therebetween. As illustrated, the rotary solenoids may be conventionally represented at 250 and 260 with each solenoid mechanically coupled to switches supported upon three separate decks. Standard forms of rotary switches may thus be used in this type of operation. The three separate decks of switches are schematically represented by the decks 251 through 261, which may be considered to be the so-called "step deck," the decks 252 through 262, representing the so-called "reset deck," and the decks 253 through 263, representing the so-called "count deck." In the operation of the circuit thus to be explained it will be understood that the rotary solenoids 250 . . . 260 are coupled to suitable respective selector switches contained in a separate adapter unit, of which the showing of Fig. 10 herein later to be explained may be considered illustrative.

The operation of the complete device is initiated by a manual depression, for instance, of the start buttom 270 which closes both the upper and lower contacting armatures 271 and 272 of the start switch 273 against the upper and lower contact points 274 and 275. Closure of the switch 273 then supplies a closed circuit between the terminal point 276 whereat a suitable source of voltage (not shown) is connected with its positive terminal toward the contact point 276 and its negative terminal grounded. Under these conditions a circuit is closed from the contact point 276 through the switch arm 271, the contact point 274, the resistor 276' and the winding 277 of a start relay, which herein will be termed, for convenience, K–114 (the reference being primarily for the ease of understanding the more complex circuit diagram of Fig. 11 and its sub-parts) to ground at 21.

The energization of the start relay K–114 closes all of the switch armatures 281, 283, 285 and 287 against their lower contact points 282, 284, 286 and 288 respectively. The switch armatures in the unenergized state of the start relay K–114 (which occurs when a ground connection is applied at terminal 381 during reset) rest against upper contact terminals 289, 290, 291 and 292 respectively. At this point in the consideration the operation with the start relay energized will first be discussed. Start relay K–114, when operated, provides a closure of armature 281 upon the contact point 282 which completes a circuit from the source of positive voltage the terminal 276 through the switch armature 281, the contactor 282, the resistance 276 and the winding 277 of relay K–114 to ground at 21. This connection maintains the start relay K–114 energized regardless of the release of the start buttom 270 following its initial depression. Simultaneously, the closure of the relay contactor 283 on the contact point 284 provides a ground through the conductor 293 and the step deck 251 of the rotary solenoid 250 (with the switch armature 325 is position "R") and its winding 254 through conductor 294 to one of the switches controlled by the step relay K–112.

Closure of relay K–114 armature 283 on the lower contact 284 (as in all states of operation, except reset, when current flows through the start relay K–114) removes the ground connection for the reset deck of the selector switch, such as 252, but a ground to switch armature 325 is established through conductor 293, as already stated.

Lastly, closure of the switch armature 287 upon the contact point 288 the output from the phase detector (a unit of the sort described by Fig. 8) which is connected at the terminal point 320 is connected via the conductors 321 and 297 to the input of the tube 300 serving as a relay amplifier, while at the same time the source of positive bias voltage previously applied at this tube from the terminal point 295 and the conductors 296 and 297 is removed.

While the start relay K–114 is always energized following a depression of the start button 270 except for condition of automatic reset, as will later be explained, it nonetheless is considered desirable at this point to make reference briefly to the connections established by the various contactors or armatures of the switches associated with the relay K–114 in the event that this relay is not energized. Under such circumstances the opening of the contact between the armature 281 and contact point 282 will, of course, break the flow of holding current provided from the point 276.

Next, the movement of the switch armature 283 from the lower contact point 284 to the upper contact point 290 will provide a ground connection through conductor 329 to the switch armature 328 (and other subsequent switches as will be explained later) of the series 250 through 260. Movement of the switch armature 285 to the contact point 291 will provide for grounding the grid of a tube 339 later to be discussed serving to operate the count relay K–115. Lastly, movement of the armature 287 against the contact point 292 connects the source of voltage available at the terminal 295 through conductors 296 and 297 and resistors 298 and 299 to the grid 301 of the tube 300.

Further consideration of the form of connections thus last described for the inoperative position of the start relay K–114 will be dealt with at a later point in this description when the resetting of the complete mechanism is discussed. For the state of operation where the start relay K-114 is energized and the output of the phase detector becomes available at the terminal point 320 and through the conductor 321, switch contact 288, switch armature 287 and conductor 297, this voltage is made available through resistors 298 and 299 on the grid or control electrode 301 of the relay amplifier tube 300. Relay amplifier tube has its anode or plate element 302 connected through the winding 305 of the accept relay K-110 to a source of positive voltage (not shown) connected with the terminal 318. Suitable current flowing through the tube 300 and the winding 305 causes energizaion of the relay K-110 and a closure of the armature 306 upon the contact point 307. This closure provides for current flow from the source (not shown) connected at terminal 309 through the winding 310 of the step relay K-112 through the switch contact 307, switch armature 306 to ground at 21 causing the step relay K-112 to become energized.

Input signals to the relay amplifier tube 300, when supplied through the resistor 298, have in the path between this resistor and ground a condenser 323. The combination of the resistor 298 and condenser 323 forms an integrating circuit having a time constant which in the normal state of operation will delay the operation of the tube 300 under phase detector output available at the terminal 320 until the condenser 323 is charged to a value adequate to overcome the positive bias on the tube cathode supplied by the connection of it to a point on the potentiometer 308 of which one terminal is grounded at 21 and the other terminal of which connects through a dropping resistor 308' to the point of connection of the positive plate voltage at terminal 318. The operation of the step relay K-112 causes the armatures 311, 312 and 313 to close upon contact points 314, 315 and 316 respectively. When this state of operation occurs a short circuit is placed about the condenser 323 in the input of the tube to the relay amplifier tube 300 by virtue of the connection established through conductor 324, relay armature 312 and contactor 315 to ground at 21 and thus removes the effect of positive biasing of the tube from the phase detector output.

Likewise, with an operation of the step relay K-112 a pulse of voltage is applied from the terminal point 309 through the contact 314, relay armature 311 and conductor 294 to the actuating winding 254 (or one of the windings such as 264 following) and thence to ground via the ring 251 on the switch armature 325 and conductor 293 to the switch contact 284 and switch armature 283 (held closed by reason of the energization of the start relay K-114) to ground at 21. This pulse will step switch 250 through one step. The switch decks 251—252 through 261—262 are of the shorting variety so that the circuit is never interrupted during a switch rotation. This insures that the switch will not make more than one step for any pulse applied to the actuating winding 254.

Simultaneously, operation of the step relay K-112 and the closure of switch armature 313 upon contact 316 provides a connection from the source of voltage (not shown) available at the terminal 345 through to conductor 343 to the plate of the count control tube 339, later to be described. The closure of armature 312 upon the contact 315 with the operation of the step relay K-112 is sufficient to reduce the curent flow through the tube 300 to a state where the accept relay K-110 will not operate because the current flowing in the coil 305 is insufficient to cause the armature 306 to close upon the contact 307. This prepares the relay armature for another cycle of operation. At the same time it de-energizes the step relay K-112 as grid 301 of the relay amplifier tube 300 is then maintained ground potential.

Each time the stepping relay functions, the rotary selector switch 250 steps one contact point in a clockwise direction. The mechanical connection provided between the step decks and other suitable decks causes the reset and count decks simultaneously to be stepped to the next position. In this operation it will be observed that for the stepping deck 251 of the rotary switch 250 (and likewise the similar deck for the switch 260 and others of like sort) has its contact points marked "R" (signifying "reset") and 1 through 10 inclusive all connected together. The contacting armature 325 makes contact to all of these points in rotary sequence. The last contact "T" (signifying "transfer") of the switch 251 connects via the conductor 326 to the next rotary switch of the sequence. Similarly, on the reset deck 252 of the rotary selector switch 250 the contact points numbered 1 through 10 and "T" are all connected together, with the reset contact points "R" connecting via conductor 327 to the switching contact of the reset deck of the next succeeding rotary switch. The switch contact arm 328 of the reset deck of the rotary switch 252 connects, as shown, via conductor 329 to the terminal contact point 290. Lastly, as far as the several rotary switches are concerned, the switch contact arm 331 of the count deck 253 of the rotary selector switch 250 connects to ground 21 and also via the conductor 332 to the next switch arm of the succeeding count deck of the rotary switch sequence. The various contacts 1 through 10 of each rotary switch 253 of the count deck are connected and also connect to a conductor 318' which, in turn, connects to the contact point 291 of the switches controlled by the start relay K-114. Likewise, this connection from the contact points 1 through 10 inclusive of the count deck 253 etc. of the rotary switches 250 is connected through a conductor 335 to the control electrode or grid 337 of a gaseous discharge tube 339 of the so-called "Thyratron" type, the operation of which will be explained at a later point hereof. Suffice it to say at the moment that each operation of step relay K-112 serves to carry the various rotary selector switches 250 etc. one step until the transfer contact "T" of each is reached.

Each voltage pulse from the source connected at terminal 309 and supplied through the switch control winding 254 of the rotary switch 250 steps the switch one contact point in a clockwise direction. When the switch armature 325 reaches the contact point marked 10 it will be observed that the next step moves the switch armature 325 over to the control point marked T. This is the transfer point and it will be noted that the outer ring 251 is clear of contact with the terminal point T. Consequently, when the switch armature 325 reaches the contact point T the ground connection is transferred to the step deck 261 of the next switch of the sequence by connection of the transfer contact T through the conductor 326 to the switch armature 373 at that instant resting upon the terminal point R (reset). The duration of the pulse supplied from the source 309 due to closure of the step relay K-112 is sufficiently long and the operation of the switches sufficiently rapid that the contact point T is reached on switch 250 before the pulse ceases so that at this time the pulse can flow through the next succeeding switch actuating winding (that is, the switch next following in the sequence) which in this instance is designated by the winding 264 of the switch 260. The pulse energization of the winding 264 of the next switch 260 of the series causes its switch armature to step one contact point and places the contacting armature 373 on the terminal point 1. Of course, the switch armatures 374 and 375 of the reset and count decks 262 and 263 are similarly stepped due to direct connection of all switches in each tier.

Each succeeding pulse provided on the conductor 294 by operation of the step relay K-112 causes the switch 260 to rotate one more step until the eleventh pulse transfers the contact to the terminal point "T" of the switch 260. At this time the next succeeding switch of the series (not herein shown) is operated in a similar fashion by transfer of the ground connection as explained.

The circuit connection thus described makes evident the fact that it is not possible to step two separate switches simultaneously. Also, the 12-position switch makes possible a reset point, a transfer point and still leave ten positions for choosing various programming and selecting operations as well as a decimal system in the switching sequence.

Since it is desirable to provide an indication of the number of tests, an indication of where the testing operation at any instant is located, the respective closures and operation of the step relay K–112 are registered by virtue of the operation of a count relay K–115 controlled by the gaseous discharge tube 339 which is caused to operate once for each closure of the step relay.

Considering now the gaseous discharge tube 339 used to operate the count relay K–115 it will be noted that the grid or control electrode 337 is connected through resistor 340 to the terminal point 341 whereat positive voltage from a source (not shown) of the order of 100 volts is applied. Similarly, the plate or anode element 342 of this tube connects via conductor 343 through the switch armature 313 and the contact point 316 to a source of positive voltage connected at the terminal point 345. Voltage is supplied the tube anode by way of the storage network comprising the series-connected resistor 346 and the shunt-connected condenser 347. Under conditions during which switch armature 313 is closed by an operation of the stepping relay, positive plate voltage is applied to the tube anode 342 and positive voltage is also applied to the grid to carry the tube to an operating state and cause current flow therethrough.

Consequently, with any one of the rotary switch arms 331 through 375, for instance, contacting any one of the contact points 1 through 10, a connection is established from the grid or control electrode 337 of the gaseous discharge tube 339 to ground 21 by way of that particular switch arm which contacts one of the terminals between 1 and 10, it being noted that after each switch contacts the tenth terminal the next step or pulse moves it to the transfer terminal T and the following switch arm moves to the terminal 1, and so on. However, as the armatures on the count deck of the switches move between the contact points 1 through 10 this ground connection is momentarily broken and terminal point 341 is connected to grid 337 through the grid resistor 340, usually of a value of the order of one megohm to apply to the grid a positive potential of the order of 100 volts from a source not shown. Consequently each time the step relay K–112 operates, and positive voltage is applied upon the plate 342 thereof from the source 345 connected through the conductor 343, it will be apparent that the tube 339 will draw current at that instant during the movement of the switch when the contactor moves between the contact points to make the bias voltage of the source 341 effective at the grid 337. Tube 339 then draws current. Current flowing through the tube from the source connected to point 345 flows through the tube anode 342 and the cathode through the winding 351 of the count relay K–115 to ground at 21. The count relay K–115 then is energized. The relay continues to remain energized until current in the tube 339 is interrupted, it being understood that the return of one of the contact armatures of the count decks 253 through 263, and so on, of the switches connect the grid to ground so that when the plate voltage is removed by de-energization of the step relay K–112 and the breaking of the contact between armature 313 and the contact point 316 the tube is rendered inoperative and count relay K–115 is rendered inoperative. It will be observed that the condenser 347 is so arranged that it is charged from the voltage source at point 345 and then with the making of the connection to supply plate voltage to the tube 339 the condenser also discharges through the tube to provide a heavy flow of current necessary to operate the count relay K–115.

The effect of this current flow in the count relay K–115 is to close the switch contact 353 against the contact point 354 so that voltage from a source (not shown) connected at the terminal points 355 can flow through the winding 356 of a counter winding to operate a suitable form of counter mechanism counting in conventional decimal sequence. Any suitable form of counter may be used for this purpose but illustrative of one which is suitable is an electrical impulse counter manufactured by Veeder-Root. This then registers the switch position at any instant by counting the steps taken subsequent to the initiation of the operating cycle.

Similarly, it will be observed that operation of the count relay K–115 also closes the switch arm 357 over against contact 359 which connects to a terminal point 360 whereat suitable biasing voltage (from a source, not shown, which may be of the order of −100 v.) is connected. The connection of the switch armature 358 to the contact point 359 then connects the bias voltage available at the terminal point 360 to the grid or control electrode 362 of an alarm tube 363, which has connected to its plate or anode 364, and in the output circuit, in any conventional manner a suitable alarm or indicating component 365 which responds to current flowing through the tube 363 to produce an alarm to show or sound a failure in the operation. The tube 363 has its cathode 367 connected to ground and in the grid circuit its grid resistor 368 is shunted by a capacity 369, which combination of resistance and capacity preferably has a time constant of the order of five seconds. Consequently, with operation of the count relay applying the biasing voltage from the terminal point 360 to the tube 363 it will be observed that the tube will not function so long as the bias voltage is applied. However, with the bias voltage removed the grid or control electrode 362 will be connected effectively to ground and the tube 363 accordingly may draw current. The time constant of the resistor-condenser combination 368, 369 is made relatively long compared to the rate at which tests are made. If, for instance, the time constant is five seconds and testing is normally carried on at the rate of three tests per second the period is fifteen times that of a normal test. As long as the condenser 369 is charged and holds this negative charge voltage for short period of time the tube 369 is held inoperative. However, if the count relay ceases to function, due to a cessation of the operation of the step relay K–112 resulting in an opening of the plate voltage circuit at the control tube 339 and the grounding of the grid of that tube through one of the count decks of the rotary switches it will, of course, be apparent that the biasing voltage applied to the tube 363 by way of the condenser 369 will leak off and soon place the grid at ground potential. Plate voltage is continuously applied to the tube so that with grounding of the grid current flow will occur and the alarm circuit 365 will be brought into operation.

In using the circuitry described by Fig. 9 when the rotary switch contacts 325, 328 or 331 reach the position 10, the next stepping position (the 11th position) is to the transfer terminal marked "T." Each contact "T" of the step deck connects via a conductor (illustratively 326) to the switch armature of the next succeeding step deck of rotary switches. This causes the ground connection through conductor 329 to be transferred to the next switch. Illustratively if the switch 260 were to follow in sequence the switch 250 the pulse following the reaching of position 10 by the switch contact 325, for instance, causes the contactor to move to position "T" and provide the transfer of the ground connection. Since the pulse duration is long compared to switching time the pulse remains after point "T" is reached and is transferred through the winding 264 into the switch 261 to cause its contact 373 to move to position 1 from its original reset position on the contact point R.

The form of connection shown thus avoids the necessity of employing separate stepping switches or transfer relays and likewise permits adding an indefinite number of selector switches, if desired. Further than this, as before also suggested, through the use of the series circuit shown it is not possible for more than one rotary switch to be stepped to any numbered position (or test) at one time. The component is also so set up that following the end of any selected test series the adapter unit, for instance, that described schematically in connection with Fig. 10, has its next succeeding test position of the selector switch wired to the automatic reset terminal 381 which drops out the start relay K-114. At such times the high positive input voltage available at the terminal 295 is applied to the relay amplifier 300 so that the step relay K-112 impulses rapidly and continuously.

It will be observed that in the return path from the rotary solenoids under these conditions will be through the reset deck 252 or 262 of the switches 250 or 260, depending upon how many of the switches are included in the sequence, instead of to ground through one of the switches of the stepping deck shown at 251 through 261. At this time all switches previously at position "T" (or any other position for that matter) are advanced in sequence to the reset position R. When all of the switches reach the position R, within a limited time after the completion of testing, a ground connection will be found to be completed through the resistor 385 which will remove the positive input signal on tube 300 and stop the operation until the start button 270 is again depressed.

In the de-energized position of the relay K-114 (and in the position in which the reset operation is diagrammed by Fig. 9) voltage from a source (not shown) connected at the terminal point 295 may be supplied along conductor 296, the relay contact 292 and the relay armature 287 through conductor 297 and resistors 298 and 299, respectively, to the grid or control electrode 301 of relay amplifier tube 300. The tube 300, it will be observed, will, under these conditions, have its grid or control electrode carried strongly positive by virtue of the source connected at the terminal 295 which illustratively may be of a value of the order of 100 volts. Application of positive voltage upon the grid 301 causes tube 300 to conduct. Current flow through the tube, as available through its plate or anode 302, flows through the relay winding 305 of relay K-110 to close the armature 306 upon the contact point 307. With such closure voltage from the source connected with its positive terminal toward the contact point 309 (for normal stepping operation) flows through the winding 310 of the step relay K-112 and contact 307 and contact armature 306 to ground at 21. The switch armature 311, 312 and 313 are thus closed against the contact points 314, 315 and 316 as they were with the control by the phase detector output at terminal 320. With each operation of the step relay K-112 and with current flow through the tube 300, the contactor 312, with current flow in winding 310, closes upon contact 315 and shorts condenser 323 to ground the grid and reduce the current flow in the tube 300. However, at this time the short around condenser 323 is removed since the step relay K-112 is rendered inoperative and the high voltage of the source available at terminal 295 quickly charges condenser 323 to a point which permits conduction in the tube 300 and operation of the step relay K-112 as a result of the accept relay being cause to function.

The functioning of this portion of the circuit may be looked upon as somewhat analogous to the well known multivibrator. This is because of the fact that as soon as the switch armature 312 closes upon the contact 315 to short the condenser 323 to ground the condenser is immediately discharged and the tube grid 301 is placed at ground. The positive bias on the tube cathode obtained through potentiometer 308 then serves to cut off the tube. When this happens and the tube plate current is reduced to a value such that the accept relay K-110 is de-energized, the step relay K-112 also is de-energized and the contact between the switch armature 312 and the point 315 is broken. This, then, permits the high voltage available at terminal 295 immediately to charge the condenser 323 to a point where the tube 300 will again conduct to energize relay K-110 and the cycle repeats. The rate of repetition of this cycle is then a function of the time constant of the then series connected resistances 385 and 298 and the capacity 323.

At the time the step relay K-112 is thus pulsed rapidly it will also be seen that with the start relay K-114 de-energized and the ground connection to conductor 293 broken but established to conductor 329 through switch armature 283 and contact 290 there is then established a new connection to ground in the switch 250 from conductor 294 and through the actuating winding 254 through the ring 251 to the ring 252 and because of the switch armature 328 to ground connecting conductor 329. Thus, pulsing of the step relay K-112 under these conditions will carry the rotation of the armatures 325, 328 and 331 (or other subsequent switches in sequence) beyond the transfer point "T" and to the reset contact "R" from which a new test sequence can be initiated.

It was above suggested that the circuitry utilized in the main or master test unit schematically explained in connection with the apparatus of Fig. 9, and explained in further detail in connection with the circuit of Fig. 11 and its various sub-parts, operates to provide the indications of acceptance and reject of the tested circuits or components thereof. To adapt the tests to be made to the different conditions and to relate the operation to particular components under tests an adapter or programming unit operated in conjunction with the main test unit (as in Fig. 11) is arranged to connect the equipment under test to the master unit. The circuitry shown by Fig. 10 schematically illustrates an adapter or programming unit, although it is also to be understood that further illustration of this type of operation may be found from the circuitry depicted as a part of Fig. 11. Referring, however, first to the circuit of Fig. 10, there has been shown a series of uncontrolled rotary switches adapted to be driven from the same driving means used to rotate the main switch units, such as those shown at 250 and 260 of Fig. 9, for instance. These switches are driven through any preferred form of coupling unit (not shown) by which the indicated shaft 401 is coupled to the master unit and serves to rotate and drive various decks or wafers of multiple switch units conventionally represented at 402, 403, 404 and 405.

In the form in which the tests have been conventionally diagrammed and identified by the legends adjoining the diagram the example is such that the first six tests, that is, tests identified by the contact of the switch arm with contact points 1 through 6, inclusive, are designed, illustratively, to take care of a checking of the minus and plus tolerances of grid, cathode and plate resistors of a standard resistance-coupled amplifier stage. Test No. 7 is set up to check the upper impedance limit on the cathode by-pass capacitor. Plate voltage operating limits are checked at terminals marked 8 and 9 with the power being applied to the circuit under test through the relay connections indicated. Finally the A.-C. signal at the plate is checked at position 10.

Following through these ten indicated steps all components, values and connections are tested and major operating characteristics are determined. The tests, of course, suggested by the diagram of Fig. 10 are purely illustrative but they do exemplify conditions to be met. Even complex equipment can be broken down into simple elements by considering one circuit at a time. In the testing work-connecting cables are terminated in a fashion which provides convenient access to the circuit under test and the test procedures are selected with possible connecting methods kept in mind. Testing connections are established by contact with sockets, connectors, terminal stops, mounting boards, etc. Because of the fact that the diagrammed connections of Fig. 10 are purely illustrative it is considered for the most part preferable to provide legend indications rather than numerical indications of components, although it will be understood that the equipment which is to be tested is to be considered as being to the left of the left-hand dotted line of the figure and to have connections provided by cables or the like to the terminal points indicated. Likewise, the connections from the adapter or programming unit occupying the central portion of the figure and which connections lead into the master unit are shown at the terminal points which are represented by everything to the right of the right-hand dotted line, and carrying a designation therebeneath reading "to master unit."

With these thoughts in mind it is now possible to refer more particularly to the showing of Fig. 11 and its various parts which function as a working embodiment of the automatic circuit shown by Fig. 9. Considering Fig. 11 and its various parts various relays and terminal panels have been designated by letters and figures and for this purpose a table of letter and figure identifications of the relays with appropriate legend identification of the components in question in order that ready reference to the components may be had in the description to follow may be read as follows:

| Symbol: | Name |
| --- | --- |
| K–101 | A.-C. standby relay. |
| K–102 | Overload relay. |
| K–103 | Power relay. |
| K–104 | Voltage control relay. |
| K–105 | Voltage control relay. |
| K–106 | Bridge selector control relay. |
| K–107 | Overload lockout relay. |
| K–108 | Delay relay. |
| K–109 | Line finder test selector relay. |
| K–110 | Accept relay. |
| K–111 | Stop relay. |
| K–112 | Step relay. |
| K–113 | Adjust relay. |
| K–114 | Start relay. |
| K–115 | Count relay. |
| K–116 | Safety relay. |
| K–117 | Alarm relay. |
| K–118 | Quiet relay. |
| K–119 | Limit reversing relay. |

The connecting switches, such as S–102A, S–102B and so on have their contact position 1 arranged for use in automatic operation of the circuit. The switch positions 2, 3 and 4 are used respectively when the operation is manually controlled, for measuring, and for an external meter.

Similarly, various switch components in the form of multiple contact switches are identified by letter and numerical identification such as S–101A, S–101B, S–101C, etc. While for purposes of drawing simplification these various switch components are shown separate one from another, it is to be understood that they actually are formed as separate decks of a single unit. These units are all unicontrolled so that all switch armatures or contactors are rotated concurrently by the same angular amount (e.g., 30° for each step of a twelve-contact switch) and in the same direction. This provides a single rotor contactor for each switch deck and, in the assumed operation, twelve stator contacts for each switch deck.

In the consideration of Fig. 11 it will be noted that it comprises a multiplicity of sheets, the arrangement of which is diagrammatically shown by Fig. 12 insofar as the manner of piecing the various parts is concerned. Consideration of Fig. 11 will be simplified by noting that various conductors and the like are arranged to continue from the components of one sheet to connect to components of another adjacent sheet. The diagram of Fig. 12 is particularly to show this arrangement in that it letters the various rectangles to correspond to the parts of Fig. 11 and places the rectangles in relationship to each other similar to the relationship of the several sheets of Fig. 11.

In the general operation for the purpose of considering the various switch positions the switch decks are shown as formed to provide twelve contact points in their various positions of which, for the purpose of simplification of the circuit diagram and the like, it may be assumed that in each switch shown stator contact points identified by the numbers 4, 5, 6, 7, 8, and 9 are each electrically connected together. Contact points numbered 1 for the assumed test sequence will be found to function in connection with the tests for direct current measurements. Contacts numbered 2 will be found to function for test measurements of leakage. Each number 3 contact is diagrammed to determine tests of continuity. The tests for resistance, impedance and, lastly, A.-C. measurements are made, respectively, with the switch armature on contacts 10, 11 and 12.

Similarly, on the switches marked S–102A, S–102B and S–102C in the diagram of Fig. 11, the position 1 is for automatic operation; the position 2 is for manual operation; the position 3 is for measuring operations; and position 4 is for external metering control.

With these thoughts in mind and following in accordance with the description made, for instance, in connection with the discussion of Fig. 2(a), reference may now be had illustratively to the circuit of Fig. 11 for the purpose of following through the contact positions in which the various components adjust themselves in testing for continuity. In this figure the input signal to the component under test may be considered to be derived at the terminal point 2 on the panel strip 407 (also generally marked J–105) which is marked "Cont. in" (continuity input) and then along conductors 411 and 412 from which the voltage is supplied to the terminal point 32 constituting the junction of legs 17 and 20 of the bridge circuit. There is then established a connection through the resistance standard 22 to the junction point 26 of the bridge legs 17 and 18.

Following through the bridge circuit itself a resistance 23 is included in the bridge leg 18 connected at its opposite end to the junction point 33 whereat the bridge leg 19 joins. The leg 19 connects through the resistor 24 to ground and to the leg 20 wherein the standard to be measured is connected through the adapter unit. As was discussed in connection with Fig. 2(a) the D.-C. amplifier and phase detector 34 is connected in the diagonal of the bridge included between the legs 17 and 20 on the one hand and 18 and 19 on the other hand which places this element between the junction points 32 and 33. The connection to the D.-C. amplifier and phase detector 34 is established in the circuit diagram of Fig. 11, and its counterparts, through the junction of conductors 411 and 412 with the switch S–101H and the conductor 417 connecting to the common terminals 4 through 9, inclusive, of the switch and through the overload relay K–102 to the input terminal 38 of the amplifier and detector. The point 33 on this bridge circuit connects by way of the conductor 418 which connects to contact point 3 on switch S–101D and thence through conductor 419 and the switch S–102D to conductor 420 and the switch S–101G and conductor 421 to the terminal point 39 on the D.-C. amplifier and phase detector 34.

For the purpose of supplying excitation to the bridge circuit a connection is provided by way of conductor 423 and the switch S–101A and conductors 424 and 425 to switch S–102C and thence via conductor 426 to the input terminal 17, also marked "excitation," on the terminal strip J–105. Also, as was depicted by the showing of Fig. 2(a) there is a connection from the point 26 through resistor element 429, the switch S–101E, the conductor 430, and the potentiometer 431 to conductor 432 and thence through switch S–101F to ground 21. A tapping point to the potentiometer contactor is obtained from the conductor 434 which connects to contact terminal 3 on the switch S–102D, which contact point is unconnected to the switch armature in the automatic operation and is thus open.

For the purpose of providing connection to a voltage source such as that shown at 25 in Fig. 2(a), the conductor 424 also connects, in addition to the connection to the conductor 425, to a conductor 437 and through the lowermost contact 438 and switch arm 439 of the bridge selector control relay K–106, through conductor 441 and the contact point 442 and switch arm 443 of the step relay K–112, and thence through the conductor 445 and the contactor 447 to contact point 448 of the overload relay K–107 and thence through conductor 468 to the switch S–101J to a source of voltage at terminal point 449 which is marked +2.5 volts, the other terminal of which (not shown) is appropriately connected to ground 21.

Thus, it will be seen that with the various rotary switches S–101A through S–101K all having their switch arms contacting the terminal point 3, a test for continuity corresponding to that explained in connection with Fig. 2 is provided, except for the fact that the unknown element corresponding to that shown at 29 is not included in the master unit. That element 29 is provided in the unknown circuit by connecting to the terminal 2 marked "Cont. in" (continuity input) which is connected to conductor 411 to the unknown source which is then provided by way of the indicated connector 451 leading illustratively to one terminal of the unknown element the other of which connects to the ground terminal point by way of conductor element 452.

For the purpose of simplifying the recitation of the various components by which the test for continuity is carried forward the continuity test diagram of Fig. 2(b) is supplied. Referring to Fig. 2(b) it will be observed that components identical with those illustrated by Fig. 2(a) have been shown but in addition Fig. 2(b) characterizes the test to be performed in such way that the various components and switch instrumentalities of the complete circuit diagram of Fig. 11 and its sub-parts are shown in a flowing diagrammatic sequence. Fig. 2(b) shows the components numbered with numberings to correspond to those referred to in the consideration of Fig. 2(a).

In the foregoing discussion it has been assumed that all of the rotary switch elements S–101A through S–101K are in the continuity position 3 (as illustrated). There has not been discussed at this point in the operation, however, the precise manner of effecting a count on the start and step, nor yet the operation of the line finding test selector relay, which will be considered at a later point. Suffice for the moment, however, reference to the test to be established for leakage to explain the switching operation. Under these circumstances reference may be made to the simplified diagram Fig. 3 and also to Fig. 11 and its various sub-parts, as well as to Fig. 3(b).

Figure 3B:
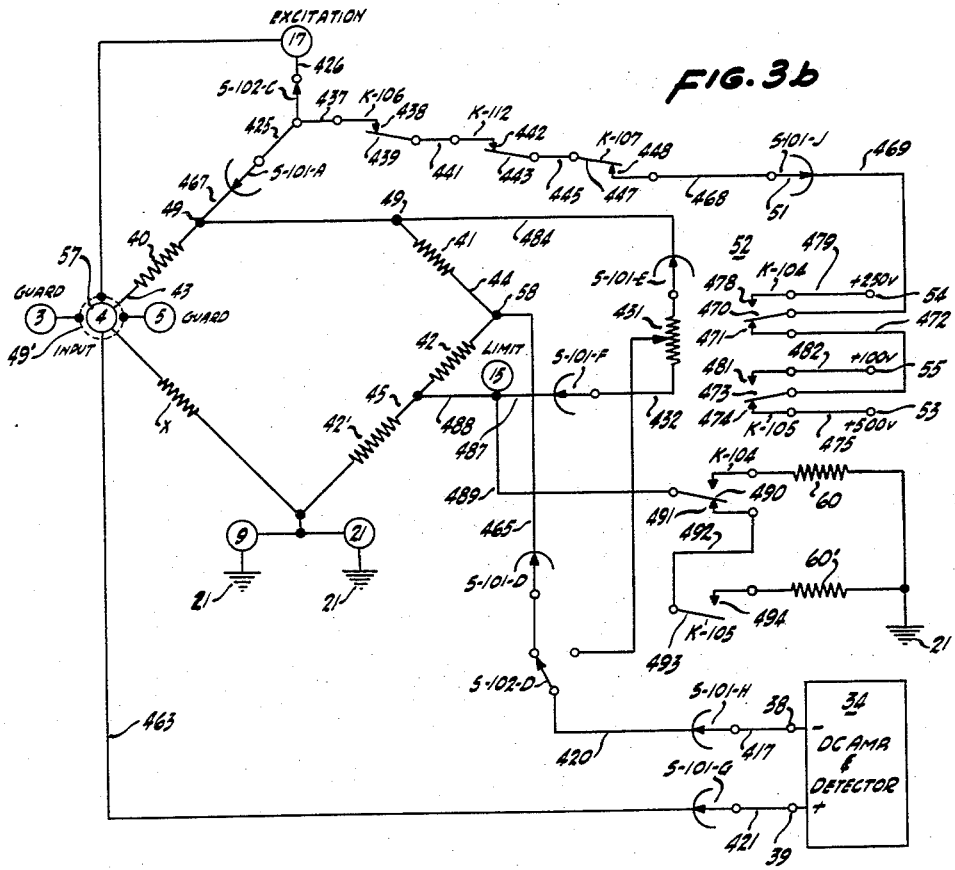

The numbering of components in Fig. 3(b), insofar as the test bridge circuit is concerned, correspond to numbers appearing upon the various parts of Fig. 11. The generally simplified leakage bridge diagram of Fig. 3(b) will simplify following the operation on Fig. 11 and its parts. In considering the test for leakage it will be assumed that the switch contactors for the switches S–101A through S–101K have all been turned one step in a clockwise direction from what is shown by Fig. 11 and its various parts so that the switch contactor rests upon the terminal contacts marked 2 and 8, each circled, it being noted that for the heretofore described test for continuity the switch contact points were on the terminal points marked 3 and 9 on each of the switches. To test leakage conditions, the input which is to be supplied is made available at the terminal point 4, also marked "leakage in" on the panel strip J–105. By way of the conductor 461 a connection is made to the terminal point 57 on the leakage test bridge circuit, as explained by Fig. 3(a). The point 57 will be recognized as the junction point of the bridge legs 43 and 46 (in the latter of which the equipment under test is connected). As was described also in connection with Fig. 3(a) the resistor 40, which is of known value, connects at one end to terminal 57 and terminates at the other end at junction point 49 whereat it joins bridge leg 44 in which a known resistance 41 is included. At the fourth leg 45 of the bridge, which includes the resistor components 42 and 42', a connection is made to the bridge leg 44 at the point 58. The opposite end of the resistor 42' is connected to ground at 21 to which point one terminal of the equipment under test is also connected.

Considering now the circuit diagram for the leakage test and the manner in which the bridge circuit is connected by the operation of the rotary switches, and making reference to both Fig. 3(b) and the parts of Fig. 11, it will be observed that, as explained in connection with Fig. 3(a), the junction points 57 and 58 on the bridge form the terminals of one bridge diagonal in which the D.-C. amplifier and phase detector component 34 is connected. This connection in the operating circuitry, as established, is made to the terminal point 57 by way of the conductor 463 and contact 2 of switch S–101G through the conductor 421 into the terminal 39 of the D.-C. amplifier 34. The terminal 58 on the leakage bridge circuit then connects via the conductor 465 to contact point 2 of the switch S–101D, from which the path is through the conductor 419 to the switch S–102D and conductor 420 to contact 2 of switch S–101H and thence via conductor 417 and the winding of overload relay K–102 to the second D.-C. amplifier input terminal point 38.

Figure 3A:
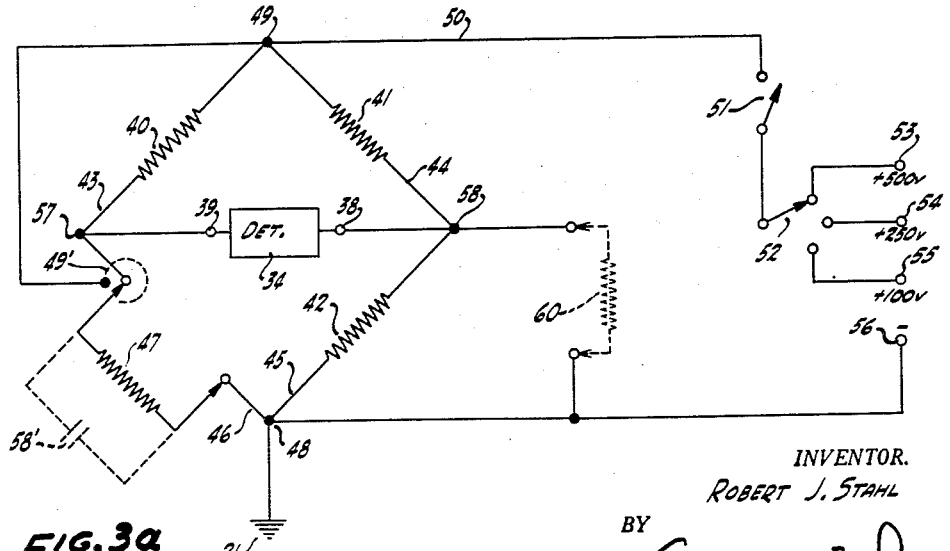

The connection for the various voltages to be supplied as explained in connection with Fig. 3(a) are provided by the connections established to the terminal point 49. Considering such a connection a path to a source of positive voltage is established through the conductors 467 and 468 to terminal 2 of switch S–101A from which by conductors 424 and 437 there is a path to switch contact 438 and switch armature 439. Conductor 441 connects to switch armature 439 and leads to switch contact 442, switch armature 443, conductor 445, switch armature 447, and switch contact 448 to conductor 468 which connects through the switch S–101J to conductor 469' which connects to the high voltage test terminal 16 (marked "H. V. Tst.") in terminal strip J–105. It may be noted that the connection from the conductor 437 through to the switch S–101J is along the same path as that followed for making the test for continuity, already explained, but in the continuity test the connection is made from switch S–101J to terminal 449, not used in the leakage test. Also through the conductor 469 and switch armature 470 meeting the contactor 471 and the thereto connected conductor 472 and switch armature 473 resting on the contactor 474 to which conductor 475 leading to the terminal point 53 is connected it may be assumed, for illustrative purposes, that a voltage of 500 volts positive relative to the terminal 53 is also applied.

For conditions where voltages other than 500 volts are to be applied and the voltage control relay K–105 is energized (under control of the adapter, as will later be explained) the switch armature 470 will come to rest upon the upper contactor 478 of the switch so that via conductor 479 voltage of the order of 250 volts positive (to the exclusion of the 500 volt source, for instance) may be supplied by the connection to terminal 54. Similarly, if voltage of a still different value is to be desired, energization of the other voltage control relay K–105 (also under control of the adapter) will cause the switch armature 473 to come to rest upon its upper contact 481 so that via conductor 482 voltage of the order of 100 volts positive relative to the terminal 55 may be applied.

There is also connected in the bridge circuit path between the junction of resistors 42 and 42' in the leg 45 a closed circuit following the conductor 487 into contact 2 of switch S–101F and thence via conductor 432 to the lower end of the potentiometer 431. From the same junction point there is established by way of the conductors 487 and 489 through the armature 490 of the relay K–104 and the contact 491 and through conductor 492 and armature 493 (in the event of armature closure upon contact 494) a conductive path through resistor 60 to ground at 21. Similarly in the event that switch armature 490 closes upon its upper contact 493 a path is provided to ground via resistor 60'.

The foregoing explains generally the operation of the switching controls for establishing measurement of leakage, but, at the moment, there has been ignored a description of the delay operation, the automatic step operation, the control circuitry and the alarm circuitry. These will be dealt with at a later point. Suffice it to say, however, at the moment, that the description is intended so far to establish the relationship between the switched circuitry and the test measurements to establish the various forms of tests which have already been discussed.

Reference now may be made to Fig. 4(a) and thence to Fig. 4(b) and the various parts of Fig. 11 for further description of the test to establish a measurement of the D.-C. voltage. In this part of the operation all switch components S–101A through S–101K are rotated to rest upon the switch terminal points 1 and 7. It will be observed that the input voltage which is available at the terminal point 65, as in Fig. 4(a), may be considered in reference to Fig. 4(b) and the parts of Fig. 11 as being that voltage available at the terminal point 1 marked "Test In" on the terminal strip J–105. This voltage is applied by way of the conductor 501 to the switch S–102B and thence via conductors 503 and 504 to terminal 1 of the switch S–101J and the conductor 468 along a path back to switch S–101A which is the same as the path described above in connection with the making of the leakage test, the components for which are numbered particularly in connection with Fig. 4(b). Upon reaching the switch S–101A with its contactor being moved over to the terminal 1 it will be observed that the circuit is completed through the conductor 505, the resistor 507, the junction point 83 (see also Fig. 3(a) for this point) and the resistor 68 to ground at 21.

The excitation voltage in this operation is introduced at the terminal external D.-C. standard terminal point 10 (marked "Ext. D.C. Std.") on terminal strip J–105. This voltage is supplied by way of conductor 523 which leads to a contactor 520 on the voltage control relay K–104, but, without energization of this relay the connection is open. If the contact is closed by energization of the relay K–104 then the external source voltages can be supplied through armature 514 and conductor 513 to ground through resistors 509 and 73.

The D.-C. amplifier and phase detector, as shown by Fig. 3(a), connects to a junction point 84 on the resistor 73 which has its opposite end terminal connected to ground 21. From the point 84 there is established through the switch S–101D and conductor 419 a connection to switch S–102D and thence along the conductor 420 to switch S–101H and via conductor 417 and the winding 121 of overload relay K–102 into the terminal point 33 of the D.-C. amplifier and phase detector 34. A connection from terminal 84 is also made through resistor 509 and conductor 510 to terminal 1 of switch S–101E from the output of which a connection is made, as in the test for leakage, to one end of resistor 431. Because in the D.-C. test the contactor of switch S–101F is moved to the terminal point 1 a connection is also made from the lower end of potentiometer 431 through the resistor 511 to ground to add a known resistance in series with the potentiometer. At the same time the connection is made into the switch S–101E a connection is also established by way of conductor 513, the switch armature 514 of the voltage control relay K–104 to the contactor 515 (or, as above noted, to contact 520) and conductor 516 to relay switch armature 517 of the second voltage control relay K–105 and thence to one of the contacts 518 or 529 of the switches operated by relay K–105. The lower contact 518 establishes a connection by way of conductor elements 519 and 520 to the junction point of two resistors 521 and 522, across which a suitable voltage source designated 524, illustratively, having its positive polarity connected to the end of resistor 522. The conductor 520 also connects to a contact point 525 adapted to be contacted by relay armature 528 when the voltage control relay K–105 is energized. In the position shown the switch armature 528 contacts the contactor 527 which is connected to the contactor 529, which in Fig. 11 is free. Thus, in the switch position shown the source 524 connects to apply positive potential on conductors 516 and 513, the negative terminal of source 524 being grounded through armature 528 and conductor 527.

With switch armature 517 closed on contact 529 and switch armature 528 connecting to the contactor 525, the source 524 is connected with its negative terminal tied to the conductors 516 and 513 and its positive terminal connected to ground through resistor 522, conductor 520, switch contact 525 and switch armature 528. The effect is that the voltage available upon the conductor 516 from the source 524 is changed from positive polarity (as shown by Fig. 11) to negative polarity. This connection change makes it possible to conduct the test for either test polarity desired. In the event that an external source of voltage is desired it will be appreciated that energization of the voltage control relay K–104 will move the switch armature 514 upward against its contact point 520 so that voltage from a source marked "Ext. D.C. Std." (external D.-C. standard) connected at terminal 10 on the terminal strip J–105 is connected via the conductor 523.

For this test so far there has been explained the manner of setting up the various connections to establish a connection of the voltage sources from the external standard and the source 524. It will be appreciated, however, that in the arrangement thus described the voltage which is to be applied to provide the measurement and the test circuit is intended to be connected through the point 1 on the terminal strip J–105 marked "Test In" to which the conductor 501 connects. This connection then will include a suitable one of the standard resistances shown at 601, 602, etc., into the circuit and from this point on a connection is then made to the equipment under test, it being understood that the standard resistor is contained in the adapter unit and in this unit, as indicated, the designations "STD" represent standard or known values and the letter X on components represents an unknown component value to be checked.

In operating the circuit of the various parts of Fig. 11 to make the tests for D.-C. provisions are made for compensating for overload, as in other connections, for the establishment of a ground seeking control, as will be dealt with in further detail in the discussion of the operation of relays K–106 and K–109, for an automatic adjustment and for a manual adjustment, which will be explained at a later point, it being understood that for the moment consideration has been given merely to the establishment of the connection to provide the components to be tested.

Continuing now the consideration of the various test operations to be undertaken and assuming that the next test of the sequence may be that of providing an indication of an A.-C. value it may be assumed that the rotary switches S–101A through S–101K have been moved one step further in the clockwise direction so as to rest against contact points 12 and 6. With the switches so set, the test for A.-C. values diagrammatically outlined in very simplified form in the simplified schematic circuit of Fig. 5(a) may be further considered. In the detailed consideration of the precise matter of setting up the test, reference may be made to the various parts of Fig. 11 and to the A.-C. voltage diagram test depicted by Fig. 5(b). As so considered the input signal again is derived at the terminal point marked 1 on the terminal strip J–105, which point is also identified by the legend "Test In." This voltage is then applied by way of the conductor 501 to the switch S–102B to the conductor 503 and conductor 504 to terminal point 12 on switch S–101J, and thence through a path precisely the same as for the D.-C. test through the various armatures and contacts of relays K–107, K–112, K–106 to the switch S–101A. With the switch S–101A having been rotated so that the switch contactor rests on its terminal 12 the connection is then completed through the conductor 537 through the resistor 109 to ground 21.

The connection of one input of the A.-C. amplifier 110 across the resistor 109 is then completed through the conductor 539, the switch S–101B, the conductor 541, the contact 542 of the A.-C. standby relay K–101 and the switch armature 543 and conductor 544 into the A.-C. amplifier 110. It should be noted in this connection that with all rotary switches having been rotated to rest upon contact 12 from the position shown that the A.-C. standby relay K–101 will have been energized because at such times a connection will have been established from a suitable source of positive potential (not shown) connected at the terminal point 570 through resistor 571 and the winding 572 of the relay K–101 and conductor 573 to contact 12 of the switch S–101C whose contact 6 connects to ground at 21.

In Fig. 11, and its various parts, the A.-C. external standard which is shown in Fig. 5(a) as connected to the terminal 99 will be found to be connected at the terminal 22 bearing the legend "EXT. AC Std." (external A.-C. standard), on the terminal strip J–105. This voltage then is supplied by way of the conductor 564 to a terminal point 563 on one of the switches operated by the voltage control relay K–104. However, in the event that a power supply voltage is to be provided to compare with the input, this voltage may be derived by the connection made at the terminal point 561, shown at the lower part of the D.-C. amplifier and phase detector 34, supplying voltages through conductor 560, contact 559, and armature 558 to conductor 557, which connects to potentiometer 431 through switch S–101E.

To achieve this form of control the resistor 101, which is shown also in Fig. 1, has one terminal connected to ground and is further exemplified in the more complete circuit diagrams of Figs. 5(b) and 11. This potentiometer has its tapping point connected to the conductor 545 and to contact point 12 on the switch S–101D and thence via conductor 419 and switch S–102D to conductors 420 and 547 to the lower contact 548 to be contacted by the switch armature 549 and thence via the conductor 550 to terminal 102 of the A.-C. amplifier.

There is also a path comprising a selected combination of shunt resistance connected across the potentiometer 101. This connection is provided by the conductors 553 and 554 through the resistor 555 into contact 12 of the rotary switch S–101E and thence via conductor 430 to the potentiometer 431, the tapping point of which is connected by conductor 434 to an uncontacted terminal on switch S–102D, whose lower terminal connects by a conductor 432 to ground by way of the rotary switch S–101F and conductor 556.

In the foregoing set-up the explanation has been made as to how various circuitry for determining A.-C. values is set up. However, again reference has been omitted to the various control circuits, the safety circuits and the stepping voltage operation but this will be dealt with in consideration with the apparatus as a whole.

Reference may now be made to the manner in which impedance values are determined. For this purpose let it be assumed that the various rotary switches S–101A through S–101K have been stepped one more contact in a clockwise direction so that all switches have their contactors resting upon the switch terminal points marked 11 and 5.

For the conditions which will be explained at the moment and without making reference to any of the reset initiation, functioning or control and referring also to the extremely simplified form of impedance diagram depicted by Fig. 6(a) the components of Fig. 6(b) and the various parts of Fig. 11 may be now considered. For these conditions it was pointed out in the description of Fig. 6(a) that the standard resistance value shown at 221 constituted one arm 228 of the bridge circuit but that the standard resistance component itself was located in the adapter or programming unit. This component is connected in accordance with the showing of the various diagrams between the terminals marked "Test In," as represented by the numeral 1 on the terminal strip J–105 and within the terminal 17 marked "EXCIT." (excitation) on the same terminal strip. The unknown impedance is represented as the component 223 included within the leg 229 of the bridge and having one terminal connected to the input terminal 234 corresponding to the input terminal marked "Test In" and the other terminal connected to ground as at 21. The bridge circuit itself, as explained in connection with Fig. 6(a), for the measurement of the impedance values is completed by way of two resistor elements, of which resistor 227 forms the leg 231 of the bridge and the resistor element 226 forms the leg 230 of the bridge, with these resistors meeting at a junction point 235. One end of resistor 226 connects by way of the switch contact 11 on the switch S–101A through the conductor 424 and the conductor 425 through the switch S–102C and conductor 426 to the excitation point marked 17 on terminal strip J–105.

It was explained in connection with Fig. 6(a) that the A.-C. amplifiers and rectifiers together with the D.-C. amplifier and phase detector component were connected in the bridge diagonal between junction points 234 and 235. This connection is provided in the circuitry depicted by Fig. 6(b) and various parts of Fig. 11 by tracing, for instance, from the point marked "Test In" along the conductor 501 through the switch S–102B to the conductor 503 and thence by way of conductor 595 to the switch contact point 11 on the switch S–101B and through the contact point 542 and the switch arm 543 (it being noted that the A.-C. standby relay K–101 is energized with switch S–101C on position 11 through conductor 544 to terminal 110 of the A.-C. amplifier.

The junction point 235 of the resistors 226 and 227 connects via contact point 11 of switch S–101D and the conductor 419 through the switch S–102D and the conductors 420 and 547 to switch contact point 548 of the relay K–101 and the switch armature 549 through conductor 550 to the terminal 102 of the A.-C. amplifier.

The opposite end of resistor 226 from that which connects to resistor 227 at the junction point 235 connects through a resistor 551 into rotary switch S–101E at its terminal 11. The end of the resistor 551 which joins to the resistor 226 connects to terminal point 11 of the rotary switch S–101A. Continuing the consideration of the connection established through the switch S–101E it will be observed that a connection is established through the conductor 430 to the potentiometer 431, the lower end of which through conductor 432 connects to the contacts 5 and 11 of the rotary switch S–101F to place resistor 552 in series therewith to ground. The tapping point on the potentiometer 431 connects to terminal 3 of the switch S–102 by way of the conductor 434 and this contact is "blank" in position shown.

Considering now the connection leading from the rotary switch S–101A it will be observed that this is similar to the connection made to this same switch component in considering the connections for tracing the continuity test down to the point where the connection is made to the switch S–101J, this path being from the switch S–101A through conductor 424, conductor 437, switch contact 438, switch armature 439, conductor 441, switch contact 442, switch armature 443, conductor 445, switch armature 447, switch contact 448, conductor 468, and thence from this point the connection is established through the switch S–101J. Conductor 611 connects switch contact 11 to the switch armature 612 which, in the position shown, contacts the switch contact 613, and through the conductor 614 makes connection, as indicated, to the terminal 615 at which alternating current of a value illustratively assumed at 3.15 volts.A.-C. If the switch armature 612 is brought over against the contactor 617 due to energization of the voltage control relay K–105 it will be observed that a connection is established by way of the conductor 618 to the external oscillator connection 11 of the terminal strip panel J–105.

The operation of this system as herein discussed is based upon the use of an A.-C. amplifier whose response is made substantially flat for a wide range of frequencies, illustratively in the range from 20 cycles to 20,000 cycles (20 kc.). This makes possible the measurement of any impedance value within this frequency range and, likewise, of course, A.-C. voltages within the same frequency range.

This completes the description of the checking for impedance values, as far as the setting up of circuitry of the sort described in connection with the diagram of Fig. 6(a) is concerned.

Of the basic tests to be considered there remains making reference to the test for resistance. Representations of resistance may be found by considering particularly the diagrammatic showing of Fig. 7(b) particularly in conjunction with what is illustrated in the simplified diagram of Fig. 7(a) and making reference also to the complete circuit diagram as exemplified by Fig. 11. In this connection it will be observed that the input as available at the input terminal 1 on the terminal strip J–105 is supplied through the conductor 501 to the switch S–102B and thence via conductor 503 and terminal 10 of switch S–101G to conductor 421 to terminal point 39 of the D.-C. amplifier and phase detector 34. The unknown resistance may be considered to be one of the resistive components in the equipment under test and which is connected through the adapter unit. Between the terminal point 1 on the terminal strip J–105 and the terminal point 17 one of the standard resistance components connected in the adapter unit is included.

Figure 7B:
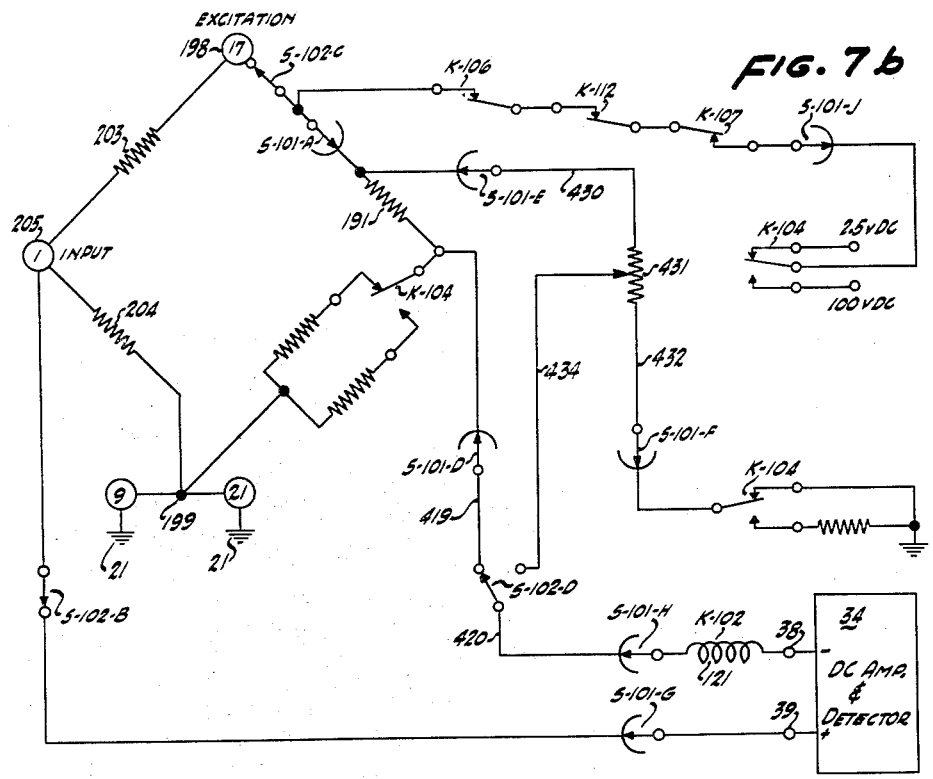
Figure 7A:
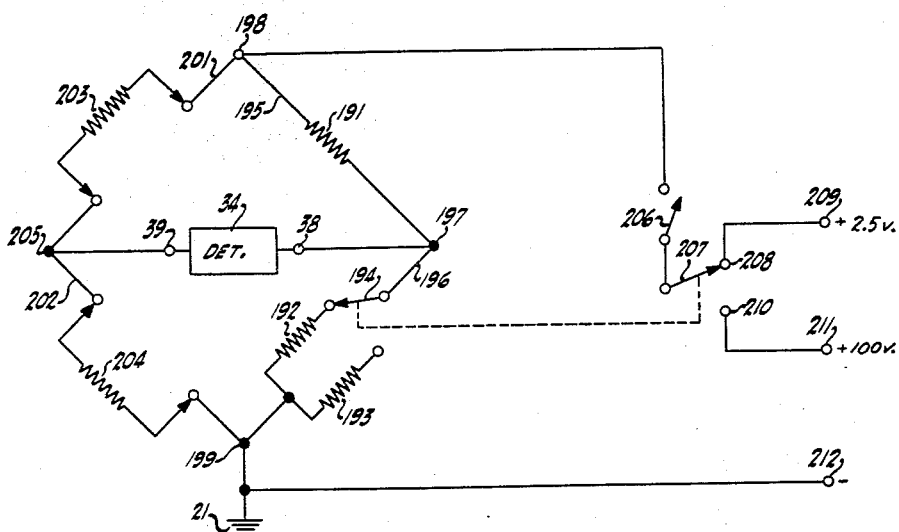

As was made apparent from the simplified test for determining resistance by consideration of the diagram of Fig. 7(a) there is connected between the terminal 17 at which excitation is applied and ground 21 a pair of resistance elements of known value. These elements are connected in the unit described by Fig. 11 between terminal 17 through the conductor 426, the switch S–102C, the conductor 425, the conductor 424, the switch S–101A between terminals 4 and 10 thereof and conductor 923, through resistor 815 and conductor 559 and then through the switch armature 823 and through one or the other resistors 824 or 814, corresponding to resistors 192 and 193 of Fig. 7(a), to ground depending upon whether the switch armature of the switch operated by relay K–104 is in its lower or upper position. In this test a ground connection may be made to both of the terminals 9 and 21 on the terminal strip J–105.

There is also connected between one end of the resistance 815 from the junction point 197 and through the conductor 825 and switch S–101D at contact 10 the other side of the D.-C. amplifier and phase detector 34 through the conductor 419 and switch S–101D, the conductor 420 and the switch S–101H to the conductor 417 and thence through the winding 121 of the overload relay K–102 which connects the terminal point 38. From the terminal of resistor 815 which connects to the switch S–101A there is also a connection to the terminal point 10 of the switch S–101E through the potentiometer 431 and conductor 432 to the switch S–101G and through its terminal 10 to conductor 827 to the armature 803 of the switches actuated by the voltage control relay K–104 where the voltage control relay armature 803 rests on the lowermost contact shown on Fig. 11 and Fig. 7(b) the potentiometer is connected directly to ground but for actuation of the voltage control relay K–104 the resistor 805 is placed in series with this potentiometer.

Suitable voltage for excitation is supplied by the connection to the switch S–101A of conductors 424 and 437 leading to the contact point 438 and armature 439 and thence through conductor 441 to contact point 442 and armature 443 of the stepping relay K–112 and thence via conductor 445 through armature 447 and contact 448 to conductor 468 connecting to the switch S–101J. From this switch element a connection is made by way of its terminal 10 and conductor 845 through to the armature 797 actuated by the voltage control relay K–104 in the position shown with the armature resting against its lower contact voltage from the source supplied at the terminal 817 is made available but if the armature is moved to its upper contact 799, voltage from the indicated 100 volt source is made available on the bridge circuit.

There remains, however, to be considered certain other factors for all of these circuit diagrams included among which are, of course, the stepping controls, the alarm controls, and other various forms of operation for establishing the testing features above explained. For these purposes reference may be made now to the various parts of Fig. 11 and illustratively to the continuity diagram. In this form of the operation one may next consider the step and start, the count, the means to apply power, and so on. Considering first in this respect the stepping and starting, it will be recalled that all of the rotary switch components S–101A through S–101K are uncontrolled and thus remain always in identical rotational position.

The operation of the circuit is initiated by the depression of the start button 270. When the start button is operated there is a voltage path from the terminal point 276 through to the lower pair of contact points 274 and the lower switch arm 271, as shown, through conductor 557 and thence through resistor 276 and the coil winding 277 of the start relay K–114 to ground at 21. Current flowing through this start relay K–114 then operates all of the switch armature 281, 283, 287, etc. to close them over against their upper contact point and opposite the position shown by Fig. 11. For these conditions it will be observed, in the first place, that the closure of the armature 281 against the contact point 282 permits a suitable supply voltage obtainable at the terminal point 276' to flow from that point through the switch contact 282, the armature 281, resistor 276, and the winding 277 of the relay K–114 to ground at 21, which holds the relay energized even though the start button 270 may be released and, as a matter of fact, is released upon initiation of the operation.

Also, at the same time, a ground is applied to coil of K–112 (other half of start button 270). This ground comes from K–106 contacts (561—560). This action causes K–112 to close. This is the manner of stepping in the manual operation.

Tube 300 is caused to act only by voltage derived from D.-C. amplifier and detector due to the presence of a signal.

This operation of the step relay K–112, also explained by Fig. 9, thus provides the stepping means for rotating the various rotary switches of the adapter unit as shown particularly by the section of Fig. 11 marked "rotary solenoid shelf" and which will include rotary switches such as the group 250 to 260 illustratively of Fig. 9.

With the operation of the start relay K–114 a connection is established from the armature 325 of the various switches (such as 250 through 260 contained in the adapter unit) via conductor 583, the terminals 1 and 11 of the rotary switch marked A (encircled) to the switch contacts 1 and 6 of the rotary switch D (encircled) and conductor 590 to conductor 293 and thence through contacts 284 and switch armature 283 to ground, as shown by Fig. 9.

At the time the stepping relay operates a control is also established through the step relay K–112 as explained also by Fig. 9, whereby the counting tube 339 is brought into operation and, from this operation, the counting relay K–115 is energized. As seen by Fig. 11 this occurs when the start relay K–114 is energized to move the switch armature 285 to its upper contact. The operation of this has been fully explained in the reference to Fig. 9 so that with current flowing through the cathode circuit including the cathode element of tube 339 a circuit is closed through the tube 339 from a source of positive voltage at the terminal 345 which is available at plate voltage for the tube when the step relay K–112 is energized to close switch armature 313 against contact 316. At this time the count relay K–115 is operated by virtue of the current flow through the winding 351 thereof.

Whenever current flows through the count relay the counter 356 of any desirable sort (not shown) which operates by virtue of current flowing through the winding 356 is energized. Also, at this same time, as was likewise explained in connection with Fig. 9 voltage available at the contact point 360 is supplied through the switch contact 359 and armature 358 through conductor 868 to become effective at the grid 362 of the alarm tube 363. The source connected at point 360 is assumed to be about 100 volts negative and serves to charge condenser 369 to this value and hold tube 363 non-conducting. It was also explained that if the counting relay K–115 does not operate with sufficient rapidity the negative voltage applied to the tube grid 362 and maintained by the condenser 369 leaks off via the resistor 368 which reduces the negative bias on the tube grid 362 and as the grid potential approaches ground potential current flows through the tube and thus through the winding 365 of the alarm relay K–117 which is in series with the tube plate voltage source.

If count relay K–115 functions at a rate about that at which the charge on conductor 369 can leak off the tube 363 is held inoperative. However, if the tests stop or are temporarily suspended there is conductivity in tube 363 and in this case operation of the alarm relay K–117 functions to produce several types of operation depending upon the various types of alarms that are desired.

The operation of the alarm relay K–117 upon conduction occurring in tube 363 causes the switch armature 627 to close against contact 628 to close the circuit from ground 21 through conductors 629 and 630 to the buzzer 631 through the armature 632 in its position against the contact 633 which connects to the source of voltage available at the terminal point 634. Operation of the buzzer 631 is arrested by depressing the "quiet" switch 641 against the contact points 642 to cause current to flow through the winding 643 and to move the armature 632 against its upper contact 645. At the same time the closure of the relay armature 627 controlled by the alarm relay K–117 on the contact 628 closes a circuit along the path 655, the contact 656 and armature 657 of the switch operated by the start relay K–114 through the conductor 659 to the switch armature 660 and the contact 661 to the lamp 665 by way of the conductor 666 leading to the terminal point 667.

Whenever the alarm relay operates it is possible to actuate an external printing device used to record the number of the test which has failed. To achieve this result and to operate a printing mechanism of suitable sort (not shown) connected at terminals marked J and K of the printer strip panel or terminal strip J–110 the closure of switch armature 675 against the contact point 676 serves to close a circuit from the terminal J through conductor 679, contact point 1 of the switch S–102F, contact 676 and armature 675 through conductor 682 to the printing contact marked K on the printers strip.

The last condition which occurs with an operation of the alarm relay K–117 is that of an indication of the operational safety of the system through the operation of the safety relay K–116. This relay is caused to function by reason of the fact that the operation of the alarm relay K–117 and the closure of switch armature 690 against the contact 691 closes a circuit from the point 692 through the winding 693 of the safety relay K–116 by way of the switch armature 690 to the contact 691 and conductor 694 through contact 695 and armature 696 of the switches associated with the adjust relay K–113 and thence through conductor 697 and the contact 698 and armature 699 of the group of switches associated with the start relay K–114, it being noted that under these conditions the start relay has been and remains energized. Consequently, the operation of the safety relay which serves to close the armatures 710 and 711 against the upper contact points 712 and 713, respectively (the armature 710 in the position in which the diagram of Fig. 11 is shown now being on a blank contact and the armature 711 being rested upon contact point 714). These conditions obtaining, it will be apparent that two conditions occur. In the first place a holding current from the terminal point 692 through the winding 693 of the safety relay is established via the conductor 715, the contact point 712, the armature 710, conductor 716, through the now energized switches controlled by the start relay K–114 to ground 21 through the contact 698 and the armature 699.

The operation of the alarm relay K–117 causes the safety relay K–116 to operate, as already explained. This is because of the fact that when the adjust relay K–113 is de-energized there is a closed circuit through the winding 693 of the safety relay K–116 through switch armature 690 and contact 691 of the alarm relay K–117 through conductor 694 and the armature 696 of the adjust relay K–113 back to ground through conductor 697, contact 698 of the start relay K–114 and armature 699. This permanently locks the safety relay K–116 because the start relay K–114 is energized during the complete test.

However, if it be desired to make an adjustment in the operation, which could be sufficiently lengthy to cause the alarm relay K–117 to be energized due to the fact that the bias on the grid 362 of the tube 363 leaked off, it would not be desirable to have the safety relay K–116 energized. Accordingly, for an adjust operation, if a ground is established through the adapter unit at terminal 20 of the terminal strip J–105 it will be seen that the adjust relay K–113 can operate because of the connection of it through the conductor 875 and the armature 281 of the start relay to the contact 282 and the source connected to point 276. This energization of adjust relay K–113 will disengage the armature 696 from the contact point 695 and under such circumstances regardless of the energization of the alarm relay K–117 the safety relay K–116 will not close.

For all tests involving leakage, continuity, resistance and impedance it will be appreciated that the voltage control relay K–104 and K–105 remain de-energized. At the time any particular test is being conducted the bridge selector relay K–106 likewise remains de-energized so that the switch armatures shown associated with these relays are in the position indicated in the diagram for all tests for continuity, for instance. Leakage tests occur with the switch contactors rotated one step clockwise until all points rest on terminal 2. With the contactor rotated one more step to terminal 1, measurements for D.-C. may take place, and on the terminal 12 A.-C. measurements are obtained. Then, for measuring impedance values the various rotary switches are all in the position 11, while, lastly, for the resistance test switch position 10 is assumed for all switches. Contact points 9 through 4 (reading clockwise) of all rotary switches, except S–101B, S–101C and S–101J, are common. Considering now, for instance, that the test for measuring values of alternating current are to be obtained, then it may be assumed that provisions may be established for providing for an operation of the bridge selector control relay K–106 to move all switches K–101A through S–101K so that the contactors rest on terminals 12 and 6. This is done under control of the bridge selector control relay K–106 and the line finding test selector relay K–109.

For this condition of operation it may be assumed, for instance, that the operation of the various rotary switches in the adapter unit is such that a ground connection is made illustratively on the panel or terminal strip J–105 wherein the terminal marked 15 and A.-C. test is connected. This ground connection will be established for this particular test operation.

Under these conditions of operation it may have been assumed that in the position of the rotary switches indicated a series of A.-C. measurement tests are to be conducted by the stepping of the various rotary switches in the adapter unit. If now it be assumed that the adapter unit will have been turned to a position such that a ground connection is established in the terminal point 15 marked also A.C. test, then it can be observed that a circuit will be closed through the bridge selector control relay winding 716 and conductor 720 to the terminal 15 which is instantly grounded.

This operation of the bridge selector control or line finding test selector relay 716 then operates to close the various switch armatures therewith associated and operated so that switch armatures 561, for instance, moves to contact the contact point 725. This operation, in turn, permits a current to flow from the terminal point 731 through the winding 732 of the stepping relay K–109 and conductor 733, the switch armature 734, contact point 735, conductor 736, contact point 725, armature 561, to ground at 21. As soon as this circuit is closed it will be appreciated that the group of rotary switches S–101A through S–101K inclusive is operated and stepping one position in a clockwise direction. However, it happens that the energization of the winding 732 of the relay K–109 simultaneously breaks the contact between the armature 734 and the contact point 735. Since the ground connection at this instant is maintained in the adapter at the point connected to terminal point 15 for the A.-C. test the relay winding 716 of the bridge selector control relay K–106 will remain energized by the same path above described and as soon as the winding 732 is de-energized by reason of the breaking of the contact between the armature 734 and contact 735 a circuit will again have been closed by the same path as previously described to re-energize the relay winding 732 once more. Then, the rotary switches S–101A through S–101K inclusive are once more stepped to the next position. This operation occurs in sequence for the assumed conditions until a condition occurs when the rotary switches have been stepped in a clockwise direction to a point such that the switch arms rest upon contacts 6 and 12 (for the A.-C. test) and in this condition it will be observed the contacts of the rotary switch short circuit the winding 719 to the bridge selector control and it is de-energized. The result is that until an operation occurs when a new ground connection is set up in the adapter the relay K–106 remains de-energized and the line finder test selector relay then can no longer operate because its circuit is closed through the switch contact 725 and switch armature 561 which can only be closed by operation of the bridge selector control relay K–106.

With this state operative it may be assumed that numerous tests for checking the assumed A.-C. operating conditions can be set up and established in the adapter unit which will occur, of course, for a state of operation when all of the rotary switches S–101A through S–101K are in a position so their switch contacts rest upon terminal 12 and 6, it being understood as above stated that terminals 4 to 9, inclusive, of all switches (except those above named) are common.

If now it be desired next to make a test, for instance, of leakage a ground connection would be established in the adapter unit at a point which connects to the terminal marker 17 and "leakage test" on the terminal strip J–105 so that conductor 735 would instantly be grounded. This, in turn, would permit the relay winding 716 of the bridge selector control relay K–106 to be energized by a path established from the point 717 through the winding 716, the conductor 718, resistor 736, and conductor 735 to the ground point and a similar stepping condition to that just previously described would occur to move the switch armature from positions where it rested against the assumed contact numbers 6 and 12 to an assumed position where the switch armature rest against contacts numbered 2 and 8. The operation then would continue upon the de-energization of the relay winding 716 by virtue of the short circuit across it which would be established by virtue of the connection between terminals 8 and 2 and around resistor 736.

It was above stated that for all tests except measurement of A.-C. and D.-C. values the relay windings 739 of the voltage control relay K–104 and 740 of the voltage control relay K–105 were de-energized. However, at times when A.-C. and D.-C. tests are to be made in the manner above suggested ground connections may be established in the adapter unit at either of the terminals 15 or 16 shown on the terminal strip and marked A.-C. test or D.-C. test respectively. For either of these conditions the line finder test selector relay K–109 will rotate the switch contactors of the switch S–101K and all of the various groups S–101A through S–101K operating therewith to a position such that for making a test of A.-C. the switch contacts will be upon the terminals 6 and 12 while for making a test for D.-C. the switch contacts will be upon 1 and 7 of each rotary switch. At this time it can be seen that the power relay K–103 will be energized by reason of the indicated connector 739 between the terminal points marked 5 (and relay K–103) and 6 (marked A.C.—D.C. ground switch) so that at this moment a path is closed from the terminal point 743 through the winding 744 of the power relay K–103 and conductor 745 through conductor 739 and conductor 746 to the terminal points 12 and 1 to which the switch contact of switch S–101I is then connected and thence to ground 21.

This will close all of the switches 747, 748, 749 and 750 and these close only during conditions of making the test for the A.-C. and D.-C. operation. Likewise it has been assumed from what has been stated above that normal tests are made in the system by the use of a voltage assumed to be 500 volts which is connected at the terminal point 51 and applied into the system through the conductor 761 leading to the terminal point 16 also marked high voltage test. This has been explained in the various preceding figures, such as for the leakage test, but in the event that it is desired to reduce the applied voltage to a lower value, then by way of a connection which is established for instance at the terminal point 1 marked relay K–104 on the panel strip, if current is caused to flow through the relay winding K–104 by way of an established ground or other connection made at terminal 1 as above stated and through conductor 762 it will be observed that voltage control relay K–104 operates and with this the connection is established to the 250 volt terminal 54 in contrast to the 500 volt terminal 53, the connection to which is then interrupted. However, if it is desired that the voltage at which the test is made shall be reduced still further, then it is desirable to switch the path of control from that leading to the 500 volt source to terminal 53 to a connection to terminal point 55, this being done by energization of the relay winding 740 of the voltage control relay K–105 through the connection in the adapter unit of a ground point to the conductor 765 which is established at the terminal point marked 2 and relay K–105 on the terminal panel strip.

Operation of the circuitry so far considered, it will be understood, causes the rotary solenoid shelf comprising the groups of rotary switches illustratively shown between 250 and 260 as in Fig. 9 and further exemplified by the showing of Fig. 11 to step one notch each time one of the relay coils 254 through 264 is energized under control of the step relay K–112. The one notch step is made by the switch armature elements 325, 328 and 331 through 373, 374 and 375. The rotation of these switches and the central drive shaft which turns them is adapted to turn the various rotary switches of the adapter unit to which the test connections from the equipment under test are made.

At this point it should be emphasized that the step relay K–112 operates to control the rotation of the plurality of three-deck rotary switches. All of these switches have two rotational positions furnished over and above the actual positions to be used in the operations otherwise to be performed. These two positions are indicated by the reset position marked "R" on the various switches and by the transfer position marked "T" on the various switches. The transfer of the stepping operation occurs each time the switches on the step deck are energized a sufficient number of times so that the armature reaches the position "T." The two decks of the rotary switches which are called the "step" and the "reset" decks are of the shorting variety but the switch driven therewith for the count deck is of the non-shorting variety. This is to be understood to mean that for the shorting switches the contacting armature does not break contact in going from one contact to the next, whereas for the non-shorting type contact is broken momentarily as the switch armature moves from one to the next contact. This is in order that as each pulse is applied through the actuating windings, such as 254, 264 and so on, it will be impossible for the step or reset deck to move more than one switch contact position for any one pulse. Likewise, with the count deck contacts and switch armatures made of the non-shorting variety it is apparent that each step moved on each switch will produce one distinct and new operation of the thereby controlled count relay K–115.

As the operation has been explained it can be seen that the switches all have their armatures on the reset contact "R" at the time the operation starts, but once the operation has started the reset position is not again achieved until the entire test operation is complete and the mechanism is reset. Consequently, during the course of the operation the various switch armatures or wipers end up on a different contact from the one on which they were placed at the initiation of the operation. This makes it possible for the relay in effect to "remember" that this part of the cycle of operation has been performed.

Use of the contact on which the rotating switch armature comes to rest as it is cycled to provide an input to the next relay in the sequence makes it possible as above outlined to cause the stepping impulses to be propagated from one stepping relay unit to the next as each completes its cycle. The circuitry exemplified and shown particularly by Fig. 9, for instance, in its schematic form emphasizes the fact that the circuit inherently functions so that it is impossible to step two separate relays simultaneously. The twelve-position switches diagrammed are employed so that after subtracting the two positions above explained, that is, the reset and transfer positions, there remains for each switch ten positions for performing the various programming and selecting operations required. This provides a convenient decimal system in the switching sequence so that numerical coding is made simple and convenient. At this point it is again desirable to emphasize that the switches start from position "R" and the first step is to contact 1. Then, stepping occurs to point "T" (the eleventh position) and as this point is reached the control is shifted to the next switch and concurrently the next switch moves from contact point "R" to contact point 1 thereof. Thus, as the first switch shifts to its eleventh position the next switch concurrently shifts to its position 1, and so on.

This particular application does not show the form of coupling between these units but it should be understood that the coupling preferably is of such a sort that the only time the adapter units as a whole may be connected to the rotary solenoid shelf of the master unit is when all of the various rotary switch components of the two sets are individually aligned. Illustratively, if the switches of the group 250, for instance, are all resting upon the terminal "T" and the switches of the last group are all resting upon the terminal 6, it will be apparent that for the adapter unit to be connected to the rotary solenoid shelf all related rotary switches of the adapter must rest upon a terminal positionally located similarly to the terminal "T" of all of the controlling switches whereas the last set of switches in the adapter unit must all be positioned on terminal 6. The coupling between these units is such that the adapter unit may readily be removed from the master unit merely by lifting it. Accordingly, for the purpose of this particular description no preferred form of coupling will be illustrated although it is submitted that among the various forms of couplings suitable for such use one has been shown by United States patent application Serial No. 450,362 filed by this applicant and George R. West and entitled "Multiple Shaft Coupling", and now Patent No. 2,781,649.

In the consideration of the various tests and the positioning of the master control switches S–101A through S–101K, the sequence of operations with the switches rotating in a clockwise position and carried on from the contact 3 upon which the switches rest in the various parts of Fig. 11 the sequence between the points 3, 2, 1, 12, 11, 10 will herein be assumed as being indicative of measurements of continuity, leakage, D.-C., A.-C., impedance and resistance. In accordance with this assumption the various circuits set up by such tests as indicated by the simplified diagrams of the parts (a) and (b) of Figs. 2 through 7, inclusive, will be found to be placed in circuit.

It was above set out that the positioning and rotation of the various switches S–101A through S–101K will be controlled by the connections set up in the adapter unit and the placing of grounds at various contacts on the different adapter switch sections so that each time a ground connection is established the line finder test selector relay will immediately step the driving element of the rotary switch S–101K to the proper position and since all of the switches S–101A through S–101K are ganged together all switches simultaneously step. It likewise will be appreciated that the rate of operation of the line finding test selector relay and therefore the operation of the switches S–101A through S–101K is considerably faster than the operation of the rotary solenoid shelf and the relay windings 254 through 264 (which control the stepping in the adapter switches). It is believed that it will be unnecessary to repeat herein the basic connections which are provided for the switches S–101A through S–101K in their various positions but it may be helpful at this point to refer to the various relays and to point out that type of operation which is to be achieved through an energization of these various components.

These will be considered in the order in which they appear on the diagram of Fig. 11 reading generally from left to right. The relay K–101 may be identified as an A.-C. standby relay. It is connected into operation, as has been above noted, only when the rotary switch S–101C rests against either contact 11 or 12 to close a path from the source 570 through the winding 572, conductor 573, and switch S–101C to ground at 21. Operation of the relay carries the switch armatures 577 and 549 to the lower contacts 542 and 548 respectively. In the down position the closure of the switch armature 543 upon the contact 542 provides excitation to the A.-C. amplifier through the switch S–101B, the switch S–101A and S–102C in the event various switches are in the position 12. If the switch armature 543 is closed upon the contact point 542 when the various switches are in the position 11 the connection is provided from the test "in" position 1 on terminal strip J–105 to the A.-C. amplifier through switch S–102B, S–101B, the closed contacts 543 and 542, and conductor 544. At the same time with the contact 548 being connected to the armature 549 a connection is established to the A.-C. amplifier at its point 102.

The connections closed with the switch armatures 543 and 549 in their up position has already been explained in what has preceded inasmuch as the operation for such type of control is established for tests on resistance, D.-C., leakage and continuity.

The relay K–102, functioning as an overload, is energized in accordance with the bias set thereon by current flowing through the winding 121. When a condition occurs where the current flow in the winding 121 is adequate to effect a closure of the switch 122 it serves to operate the overload relay K–107 by providing a closed circuit path from the terminal 790 through the winding 791 and the conductors 792 and 793 and the switch 122 to ground at 21.

The operation of the power relay K–103 obtained when the switch arm of the rotary switch S–101I is on contacts 1 or 12 has already been explained.

Considering next the voltage control relay K–104 its operation is initiated at such times as a current connection is established through the adapter at terminal 1 of the panel J–106. It has already been explained that if the voltage control relay K–104 is operated the relay armature 470, 490, 514, etc. will be moved against their upper contacts. Considering first the uppermost switch armature 470, it will be observed that when armature 470 contacts terminal 478 the supply of the 500 volts from terminal 53 to the conductor 469 and 761 is interrupted but in its stead a 250 volt supply connected from the terminal 54 is supplied to these same conductors. This condition would obtain particularly at the time when a leakage test is being conducted.

At this time with the switch contactors of switch S–101J on the terminal 2, for instance, the 250 volts is supplied through the conductor 469, the rotary switch S–101J, the conductor 468, contact 448, switch armature 447, conductor 465 through the switch armature 443 and contact 442 and conductor 441 through the lowermost switch contact 439 operated by the bridge selector control relay K–106 and the contact 438 through conductor 437 to switch S–101A and thence via conductor 468 and conductor 467 through to the point 49 on the leakage bridge circuit.

Still assuming that the voltage control relay K–104 is energized by current flow through the winding 739 the second switch from the top has its armature 490 contacting the terminal 493 and this, it will be observed, places the resistor 57 in shunt with the resistor 42′ on the leakage bridge.

With the third switch from the top closing the circuit between armature 514 and contact 520 it will be observed that the external D.-C. standard available at the terminal 10 on the panel or terminal strip J–105 by way of conductor 523 is connected to one end of the potentiometer 431 when the switch S–101E is on position 1 (for a D.-C. test) and also this point connects to ground through resistor 73 as well as to one side of the D.-C. amplifier through the switch S–101D (in position 1), switch S–102D and the switch S–101H and the winding 121 of the overload relay K–102.

The fourth switch from the top, which is operated by the relay K–104, when connected to the voltage terminal contact point 795 and through the contactor 796 and armature 797 to the potentiometer 431 in the making of the test 10 for measurement of resistance. In this same test operation the fifth switch from the top when operated so that the armature 803 closes on point 804 serves to connect resistor 805 in the path between ground 21 and the lower end of the potentiometer 431 through the switch S–101F for the making of the resistance test when the rotary switches are on contact 10.

The sixth switch from the top so operates that when the switch armature 558 closes against contact point 563 an external A.-C. standard from the terminal point 22 on the panel strip J–105 is connected to the upper terminal of the potentiometer 431 through the rotary switch S–101E in making the test for A.-C. and the switches in terminals 12 and 6. The bottom switch armature 811 when closed upon the contactor 812 connects the resistor 814 in series with resistor 815 and the potentiometer 431 for the making of the resistance test when the switch contacts are on the terminals 10 and 4 and thence the connection is made to the terminal 38 of the D.-C. amplifier.

The voltage control relay K–105 may next be considered and then, when all of the switches are in the positions shown, it has already been explained that when the top switch is down it connects either the positive source of voltage represented at 500 volts connected at the terminal 53 or the 100 volt source represented as connected to the terminal 55, to the exclusion of the voltage source connected to the terminal 54, into the conductor 761 and 469, as above explained. With the second switch armature from the top 493 in its downward position it is open but in the upper position against contact 494 resistor 60 is connected to shunt resistor 42′ of the leakage bridge in the event that the voltage control relay K–105 is operated and leakage is being measured.

If the switch armature 514 is down to rest against the contact point 515 (that is, in the de-energized state of relay K–104) there is a control over the polarity of the source 524 supplied along the conductor 513, as previously generally noted, so that either a positive voltage or a negative voltage may be had determined by whether or not the relay K–105 is inoperative or operative, respectively. The armature 803 when resting against the lower contact connects terminal 10 of switch S–101F to ground and thus for the resistance test another path to connect the lower end of the potentiometer 431 to ground is provided over and above that shown as being achieved for the continuity test (the position indicated).

The lowermost switch armature 612 in its lower contact position connects in the case an impedance test is being made to the contact point 11 on the rotary switch S–101J and thence through a suitable path to connect a 3.15 A.-C. voltage source available at the terminal 615 on the phase detector to the junction of resistors 551 and 226 with the path including the rotary switch S–101J in its position 11, armature 443 and contact 442 operated by the step relay K–112 (it being assumed that the relay in the instance is inoperative) through the lowermost switch operated by the relay K–106 and conductor 437 and switch S–101A.

The operation of the relay K–106 has already been explained as well as the operation of the energization of the overload relay K–107 at times when the overload relay K–102 is operated. It is to be noted at this point that with the overload relay K–107 operated there is a break between the contact 448 and the switch armature 447 so that the switch armature 447 rests against the lower contact point 841 which connects at this point to the input terminal of the D.-C. amplifier so that a connection is provided along the same path as already explained through conductor 445, etc. into the D.-C. amplifier. With the overload relay K–107 operated a holding current is provided by way of the lower switch armature 843 resting upon contact 844 to provide a holding current through the relay winding 791 to ground 21 through the closed switch.

The operation functioning of the delay relay K–103 occurs at a time when a ground connection is setup at the terminal 7 on the panel or terminal strip J–105 to close the circuit through the conductor 849 at 850 through the relay winding 851 to the terminal point 852. Such connection being established, it will be apparent that there is placed in circuit with the conductors 864 and 865 a capacity element 856 and 857 respectively connected to ground by way of the respective upper switch contact 858 and lower switch contact 859 coming to rest upon the contact points 860 and 861. It will be observed that the condenser 856 is then placed across the grid circuit of the tube 300 and connected in parallel with the condenser 323 by way of the conductors 864 and 866. These capacitors 323 and 856 then begin to charge from the source connected at terminal 965 connected through resistors 966 and 967 and conductor 968. The resistor 969 connects to ground and forms with resistor 966 a voltage divider so that charging of the condensers occurs through resistor 967, with the time constant provided by capacities 323 and 856 and resistor 967 set for a long period, such as thirty (30) seconds. This delay period is important in the case of providing suitable warm up time for equipment which is required in cases particularly when dynamic tests are to be made.

Also because of the connection by way of conductor 865 and conductor 868 the condenser 857 is connected in parallel with the condenser 369 of the tube 363 serving to operate the alarm circuit and in either case the connection of these condensers changed the time constant in the respective grid circuits.

The operation of the relay K–109 has already been explained above and need not be considered further at this point.

The accept relay K–110 has already been generally discussed so that in review suffice it to state that one terminal of its winding 305 is connected to the plate 302 of the accept tube in the fashion shown in more schematic form by the diagram of Fig. 9. In the form in which the component is illustrated by Fig. 11 and its various parts, it will be observed that the tube 300 is controlled by the output from the D.-C. amplifier and phase detector as available at the output terminal 320 and supplied along the conductor 321, the switch contact 288, and the switch armature 289 and thence through conductor 297 (as in Fig. 9) connecting to the grid through the resistor combination 298 and 299 shunted by the condenser 323. As was also explained in connection with the showing of Fig. 9 the conductor 866 is connected to the conductor 324 which in turn connects to the armature 312 of the various switches operated by the step relay to provide a ground connection through the contact point 315. From this point on the operation coincides with that already explained and the step relay K–112 operates through the closure of the armature 306 on the contact 307 and through the connection by way of conductor 571 and the switch S–102E connecting through conductor 573, relay armature 574, contact point 575, and conductor 576 through to the winding 310 of the step relay K–112 and thence to the terminal point 309 whereat positive voltage is supplied.

Further consideration may now be given to the stop relay K–111 which component is brought into functioning by way of a ground connection which may be provided in the adapter unit at contact point 8 on the terminal strip J–105 and through the conductor 871. It will be observed also that the stop relay in addition to what has been explained can be energized by virtue of the connection through the conductor 876 to the conductor 877 and thence through the reset switch 878 and the interlock switch 879 to ground through the armature 881 of the group of switches operated by the start relay.

The operation of the remaining relays has already been explained in detail.

The A.-C. amplifier which was exemplified particularly by the unit included in the operation of the test for impedance and A.-C. voltage measurements and which was explained schematically in connection with the showing of Fig. 11 is represented in further detail by the circuit diagram of Fig. 13. In this figure the input signals available at the terminal points 110 and 102 are shown as supplied to the grid or control electrodes 887 and 888 of the amplifier tubes 889 and 890, respectively. These tubes each derive voltage from a common source connected at the terminal point 891 supplying the tubes with plate voltage through their load resistors 892 and 893. The tubes 889 and 890 have their cathodes biased by resistors 895 and 896 appropriately by-passed by condensers 897 and 898. Output signals are supplied by way of the usual capacity-resistance couplings 901, 902, 903 and 904 into the grid or control electrode 907, 908 of the next succeeding tube 909 and 910 of the cascade. Tubes 909 and 910 receive plate voltage from the source connected at 891 through plate resistors 913, 914. Cathode elements of these tubes also are biased in normal fashion and the outputs are supplied also by way of the resistance coupling indicated to the grid or control electrode of the tubes 915 and 916 which have a cathode output derived from the cathode elements 918 and 919 taken across the respective cathode resistors 920 and 921 connected to feed into the rectifier tubes 923 and 924 respectively. The tubes 915 and 916 have plate voltage supplied thereto by way of the source connected at the terminal point 925 and cathode bias is applied in the tubes from the bias source connected at the terminal point 926. The output voltage derived from the rectifier tubes 923 and 924 after being suitably filtered by the resistor-condenser combinations comprising condenser elements 927 and 928 connect by way of the connection conductors 552 and 551, through switches S–101G and S–101H to the input terminals of the D.-C. amplifier 34.

The block diagram of Fig. 14 is intended to summarize and show the functional relationship of the various components described in the various figures of the assembly and particularly the functioning relationship of the components of the various sheets comprising Fig. 11. The adapter or programming unit is shown in dot-dash outline and is indicated both by the legend "Adapter" and also by the numeral 13, as in Fig. 1. It contains the various rotary switches of the sort shown assembled particularly by Fig. 11. These switches may be assumed for instance to be comprised in four different decks labeled by the letters (A), (B), (C) and (D). The excitation is supplied by way of the excitation terminal indicated by the legend "Excitation Voltage." The standard, in this instance illustrated as a resistance, with which the unknown resistance is to be compared, is contained within the adapter unit. The unknown quantity, in the illustrated case also a resistance, is in the component to be tested. It is located externally of the adapter but is connected in the adapter by means of a suitable cable or the like. The bridge selector is provided by the component so labeled and is determined by the six tests which in this instance are to be determined, namely, continuity, leakage, D.-C., A.-C., impedance and resistance.

A selection of the proper bridge component is provided in this diagrammatic showing to follow the form of operation explained in connection with the operation of the line finder test selector relay K–109 functioning in conjunction with the bridge selector control relay K–106, as explained by Fig. 11. The operation of these selectors is such that the desired components in the bridge selectors incorporated in Fig. 11 may be determined. The D.-C. amplifier and phase detector 34 is diagrammatically shown in connection with the input from the adapter unit and illustratively shown in relation to the two fixed resistance components, such as the components 23 and 24 used in connection with the test for continuity for instance. The output from the D.-C. amplifier, as was explained in connection with the showing of the various figures schematically representing the operation depicted by the composite diagram of Fig. 11, is caused to operate and control functioning of the accept circuit, which is schematically represented by the block diagram for the accept relay K–110 operated in conjunction with the tube 300 (not shown in Fig. 14).

The start of the operation in the functional diagram of Fig. 14 is, of course, controlled by the same start button 270 shown in the remaining figures for causing the start relay to function. The step relay K–112 diagrammatically represented by the block marked "Step Circuit" on Fig. 14 is caused to operate in accordance with the output of the accept circuit. This controls the operation of the count circuit in which the relay K–115 is included.

In the event that a rejection of the test occurs the alarm circuit and the component represented by the relay K–117 are caused to function, with which operation the reject light such as 665 is brought to an illuminated state. The rotary solenoid operating to control rotation of the various selecting relays of the adapter is diagrammed by the block 254 with the various decks of this relay, such as the stepping deck, the reset deck and the counting deck illustratively indicating the switches marked by the letters (A), (B), and (C) in Fig. 11.

The automatic printing operation may take place, as explained in connection with Fig. 11, under the control of the count circuit through the energization of the terminal points J and K of terminal strip J–110 by way of conductors 679 and 682 as in Fig. 11. Selection between an automatic and manual operation is provided by way of the indicated switches, which correspond illustratively to those shown in the groups S–102A, S–102B, and so on.

In the foregoing description reference has been made to the various test circuits which are established under the control of the programming unit so that certain component parts of such test circuits are selected from the circuit to be tested, whereas other component parts to complete the test circuits are selected from components included in either or both the programming unit and the master unit.

The foregoing description sought to make clear that, in some instances, it is desirable to select the majority of the component parts of the test circuits from the master unit whereas other tests may select more components from the programming unit or the circuitry under test. The significant characteristic is that in all testing there, of course, must be at least one circuit component included in the circuit to be tested, and the programming unit, as cooperating with the master unit, determines the remaining test circuit components.

With these thoughts in mind it is, of course, apparent that, strictly speaking, certain of the tests hereinabove described function on what is more commonly considered the determination of ratio, which type of measurement is most commonly referred to as bridge circuit measurement, whereas other tests are determined on the basis of comparisons. Collectively these two types of circuits are herein broadly identified in certain hereinafter appended claims by the reference to differentially responsive test circuits in that a difference signal is developed between two branches of the test circuit which respectively establish the standard value and the unknown value which is differentially compared in the measuring circuit.

Having now described the invention, what is claimed is:

1. Electrical test and measuring apparatus comprising a master unit including a plurality of testing circuits adapted individually to determine different parameters entering into the operation of electrical circuitry to be tested, a programming unit associated with the master unit and a component to be tested, means for driving the programming unit in step-by-step fashion under control of the master unit to select at each step an electrical test to be made, a measuring element, means included in the master unit and controlled from the programming unit for switching between individual test circuits and concurrently connecting the selected test circuits to the measuring element, means included in the master unit for selecting the switching rate between successive tests normally to occur in a regularly recurring time sequence and means included in the master unit and controlled by the programming unit for lengthening the time period of tests in a selected order determined by the programming unit.

2. Electrical test and measuring apparatus of the character claimed in claim 1 for testing circuitry and to provide indications of circuit continuity, leakage, impedance, resistance and alternating and direct current, a switch means included in the master unit and means operating under the control of the programming unit to drive the selector switch means to choose between the individual test circuits.

3. The electrical test and measuring apparatus claimed in claim 1 comprising, in addition, means operating in a time-delay relation with each individual testing indication for printing and recording the test number of each failure or reject occurring during each test cycle.

4. The apparatus claimed in claim 1, comprising, in addition, means controlled by the programming unit for arresting the normal test sequence to permit the making of manual adjustments during such arrest period and manually controlled means for restarting the testing sequence following an interruption.

5. The electrical test apparatus claimed in claim 1 comprising, in addition, means controlled by the programming unit for supplying voltage to the circuit under test during periods when the A.-C. and D.-C. voltage tests are to be made.

6. In combination with testing and measuring apparatus, a stepping switch having drive means, a thermionic tube, means energizing said drive means through said thermionic tube, a counting means connected to be operated under control of current flowing through the tube, means to supply operating voltage interruptedly to the tube in response to satisfactory test results of said apparatus to permit current flow only at times corresponding to periods of completion of test measurement, and means operative following each test for interrupting the current flow through the tube thereby to de-energize in step-by-step fashion the thermionic tube and thus the switch drive means and counting means controlled thereby.

7. Automatic testing apparatus for sequentially checking a plurality of values in an electrical circuit, comprising a master unit containing a plurality of test facilities for checking a variety of electrical values, selectively, and a programming unit removably connectable to said master unit and to the circuit that is to be tested, said programming unit containing multi-position switching means, operable step-wise to a multiplicity of switch positions, sequentially, under automatic control of said master unit, and being permanently custom-wired for performing a selected sequence of tests upon said circuit by connecting various parts of said circuit to various ones of said test facilities as said switching means is operated from one switch position to another, whereby selection of the circuit parts and values that are to be checked by the master unit and selection of the order in which various tests are to be performed are determined by the construction and wiring of the programming unit, so that different types of circuits can be tested, and different values can be selected for checking, and different sequences of testing can be established, by substituting different, appropriately wired programming units.

8. Apparatus as defined in claim 7, wherein said test facilities comprise continuity-testing means, leakage-testing means, resistance-testing means, impedance-testing means, A.-C. voltage testing means, and D.-C. voltage testing means.

9. Apparatus as defined in claim 7, wherein said multi-position switching means within the programming unit comprises a plurality of multi-position, rotary switches individually driven from one switch position to another by a plurality of continuously rotative shafts removably connected to said master unit.

10. Apparatus as defined in claim 9, wherein said master unit comprises repeatedly operable driving means for rotating said shafts, individually and step-wise, in sequence, by successive amounts each corresponding to one change in switch position of said multi-position switching means in the programming unit, said driving means being responsive to said test facilities and operating once upon the successful completion of each test of an electrical circuit value.

11. Apparatus as defined in claim 7, wherein said programming unit comprises a plurality of circuit elements serving as standards for the various electrical values that are to be checked, said multi-position switching means connecting different ones of said standards to said master unit as said switching means is operated from one switch position to another and providing a plurality of switch positions at each of which a selected part of the circuit to be tested and a selected one of said standards is connected to a selected one of said test facilities in the master unit, all such selections depending upon the wiring of the programming unit and being independently variable by modification of said wiring, each of said test facilities being operable automatically to compare an electrical value of said selected part with an electrical value of said selected standard.

12. Apparatus for performing automatically a selectively programmed sequence of operations, comprising a repeatedly operable positioning device, a plurality of electrical terminals, a plurality of interchangeable, plug-in, multi-position switching devices each, selectively, adapted to be removably connected mechanically to said positioning device and electrically to said terminals, each of said switching devices, when so connected, being operated to a plurality of switch positions in sequence by repeated operation of said positioning device, each of said switching devices being permanently wired and constructed to make a plurality of different electrical connections, in sequence, to and between said terminals as said switching device is operated to said plurality of switch positions in sequence, the several interchangeable switching devices being differently wired and constructed so that the sequence of electrical connections made by repeatedly operating said positioning device can be changed by substituting one of said switching devices for another, and means for automatically performing each of a plurality of different operations, selectively, under the control of said electrical connections, whereby a program of the last-mentioned operations is performed automatically in sequence by repeated operation of said positioning device, said program being controlled by the wiring and construction of the selected switching device and being selectively variable by interchanging said switching devices.

13. A master unit for automatic testing apparatus adapted to check, sequentially, a plurality of values in an electrical circuit in accordance with any selected one of a plurality of testing programs established by respective ones of a plurality of interchangeable, differently wired, multi-position switching units, each switching unit having a plurality of individually rotative shafts and a plurality of electrical terminals between which different electrical connections are established by rotating said shafts to different positions, the several switching units being selectively usable with the master unit to constitute one complete testing apparatus, said master unit comprising a plurality of rotative shafts adapted for removable connection to the shafts of a selected switching unit, a plurality of electrical terminals adapted for removable connection to the terminals of the same selected switching unit, a plurality of test facilities for automatically checking a variety of electrical values, selectively, means connecting said facilities to respective ones of said terminals of the master unit so that the test performed at any given time is determined by the wiring and switch position at that time of the selected switching unit, and means for automatically rotating said shafts of the master unit in a step-wise manner, one step upon the completion of each test by said test facilities, whereby a plurality of different electrical values are automatically and sequentially checked according to a program determined by the wiring of the selected switching unit.

14. Automatic circuit-testing apparatus comprising a plurality of test facilities for individually checking different electrical circuit values of test units, multi-contact step switching means sequentially connecting portions of test units to separate test facilities, step drive means operating said switching means in a step fashion, detecting means connected to said test facilities and producing output signals relative to separate tests of components of test units, means connecting said detecting means and step drive means for discontinuously energizing the latter in accordance with detector output whereby said drive means are only energized to actuate said switching means upon the passing of each test by test unit components so that said switching means does not move from a position connecting a faulty test unit component with a test facility, and indicating means for test failure connected in time-delayed relation to the switch drive means for providing a failure indication after a predetermined switching time delay whereby transient responses in testing are automatically excluded from actuating the indicating means.

References Cited in the file of this patent

UNITED STATES PATENTS

| | | |
|---|---|---|
| 2,081,690 | Unk | May 25, 1937 |
| 2,232,792 | Levin | Feb. 25, 1941 |
| 2,261,573 | Stryker | Nov. 4, 1941 |
| 2,328,750 | Smith | Sept. 7, 1943 |
| 2,329,491 | Sulzer | Sept. 14, 1943 |
| 2,442,427 | Mullerheim | June 1, 1948 |
| 2,468,398 | Griffin | Apr. 26, 1949 |
| 2,538,789 | Maynard | Jan. 23, 1951 |
| 2,584,680 | Doncyson | Feb. 5, 1952 |
| 2,601,491 | Baker | June 24, 1952 |
| 2,610,229 | Cranford | Sept. 9, 1952 |
| 2,685,052 | Boyer | July 27, 1954 |
| 2,699,528 | Periale | Jan. 11, 1955 |